United States Patent
Tsuchiya et al.

(10) Patent No.: US 9,525,822 B2
(45) Date of Patent: Dec. 20, 2016

(54) IMAGING APPARATUS AND IMAGE BLUR CORRECTION METHOD

(71) Applicant: OLYMPUS CORPORATION, Hachioji-shi, Tokyo (JP)

(72) Inventors: Hitoshi Tsuchiya, Hamura (JP); Yoji Osanai, Hachioji (JP)

(73) Assignee: OLYMPUS CORPORATION (JP)

( * ) Notice: Subject to any disclaimer, the term of this patent is extended or adjusted under 35 U.S.C. 154(b) by 0 days.

(21) Appl. No.: 14/874,239

(22) Filed: Oct. 2, 2015

(65) Prior Publication Data
US 2016/0028958 A1    Jan. 28, 2016

Related U.S. Application Data

(63) Continuation of application No. PCT/JP2014/057392, filed on Mar. 18, 2014.

(30) Foreign Application Priority Data

Apr. 18, 2013  (JP) .................................. 2013-087689

(51) Int. Cl.
| | |
|---|---|
| *H04N 5/225* | (2006.01) |
| *H04N 5/232* | (2006.01) |
| *G03B 5/00* | (2006.01) |

(52) U.S. Cl.
CPC ............ *H04N 5/23287* (2013.01); *G03B 5/00* (2013.01); *H04N 5/23261* (2013.01); *G03B 2217/005* (2013.01); *H04N 5/23258* (2013.01)

(58) Field of Classification Search
CPC ..................................................... H04N 5/225
(Continued)

(56) References Cited

U.S. PATENT DOCUMENTS 5,761,545 A * 6/1998 Tanaka ..................... G03B 5/00
                                                                   348/E5.046
6,414,715 B1    7/2002 Sato
(Continued)

FOREIGN PATENT DOCUMENTS

| JP | 5-216104 A | 8/1993 |
|---|---|---|
| JP | 2006-171654 A | 6/2006 |

(Continued)

OTHER PUBLICATIONS

International Search Report mailed in corresponding International Patent Application No. PCT/JP2014/057392 on Jun. 17, 2014, consisting of 3 pp. (English translation provided).
(Continued)

*Primary Examiner* — Joel Fosselman
(74) *Attorney, Agent, or Firm* — Volpe and Koenig, P.C.

(57) ABSTRACT

An imaging apparatus includes a follow shot control unit and a blur correction unit. The follow shot control unit calculates a panning angular velocity and a tilting angular velocity based on a first or second angular velocity for an image pickup device on the basis of magnitude correlation between the first and second angular velocities for image pickup device and on the basis of an inclination angle immediately before exposure and a ratio between the first and second angular velocities, when a state is a following shot state. The blur correction unit calculates an image blur correction amount on the basis of a difference between the first angular velocity and the panning angular velocity and a difference between the second angular velocity and the tilting angular velocity.

8 Claims, 14 Drawing Sheets

(58) Field of Classification Search
USPC .......................... 348/208.4, 208.99; 396/53
See application file for complete search history.

(56) References Cited

U.S. PATENT DOCUMENTS

| | | | |
|---|---|---|---|
| 6,734,902 B1 | 5/2004 | Kawahara | |
| 2009/0135261 A1* | 5/2009 | Imamura | H04N 5/23248 |
| | | | 348/208.99 |
| 2009/0245769 A1 | 10/2009 | Uenaka | |
| 2011/0158619 A1 | 6/2011 | Kanayama | |
| 2012/0033091 A1 | 2/2012 | Miyasako | |

FOREIGN PATENT DOCUMENTS

| | | |
|---|---|---|
| JP | 2012-058545 A | 3/2012 |
| JP | 2012-163852 A | 8/2012 |

OTHER PUBLICATIONS

International Preliminary Report on Patentability issued in corresponding International Patent Application No. PCT/JP2014/067941 on Oct. 20, 2015, consisting of 7 pp.
Search Report issued in corresponding European Patent Application No. 14785892.2 on Aug. 26, 2016, consisting pf 6 pp.

* cited by examiner

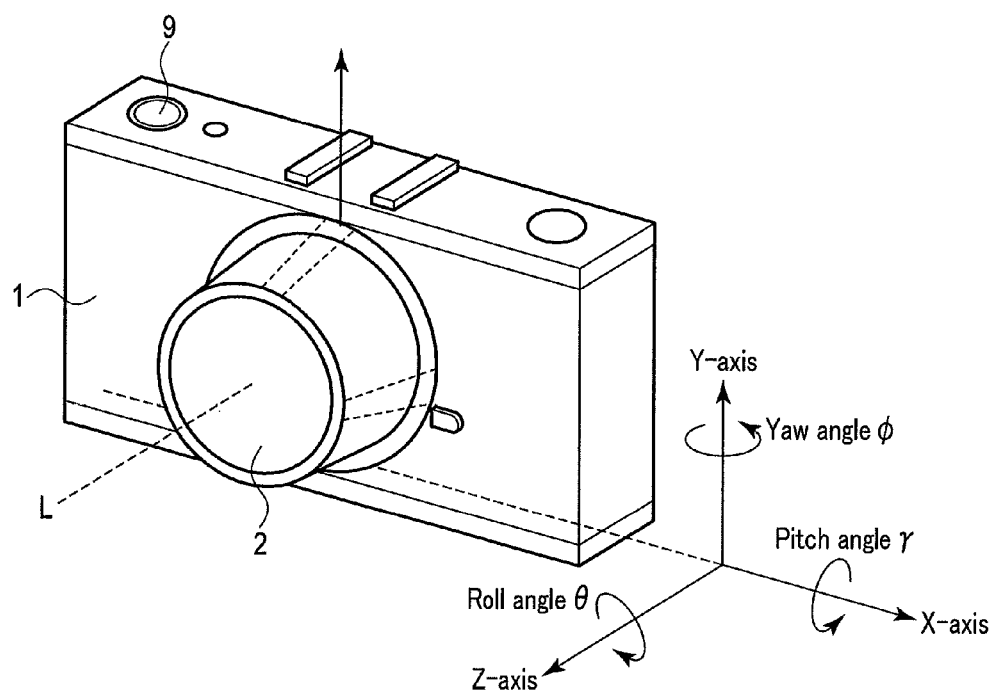
F I G. 1

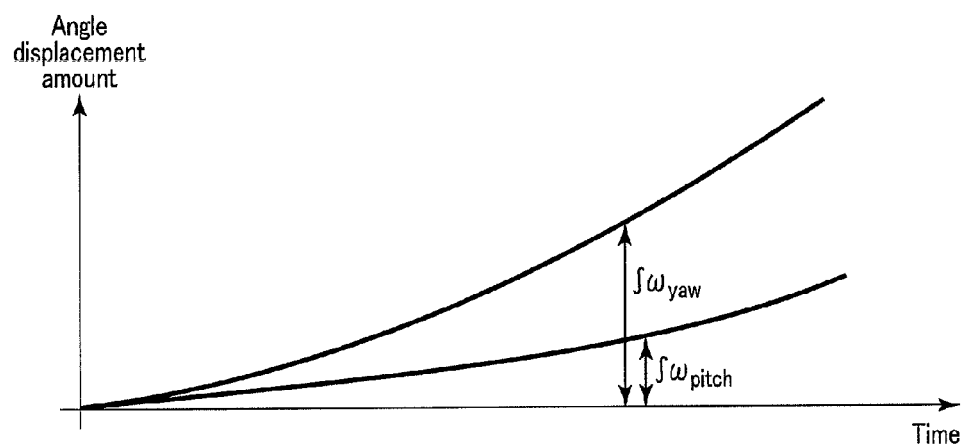
F I G. 3
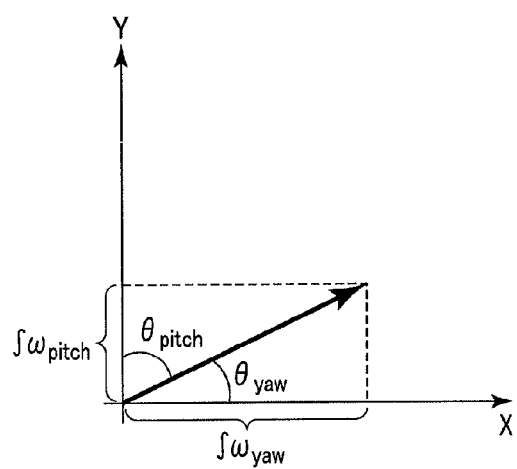
F I G. 4

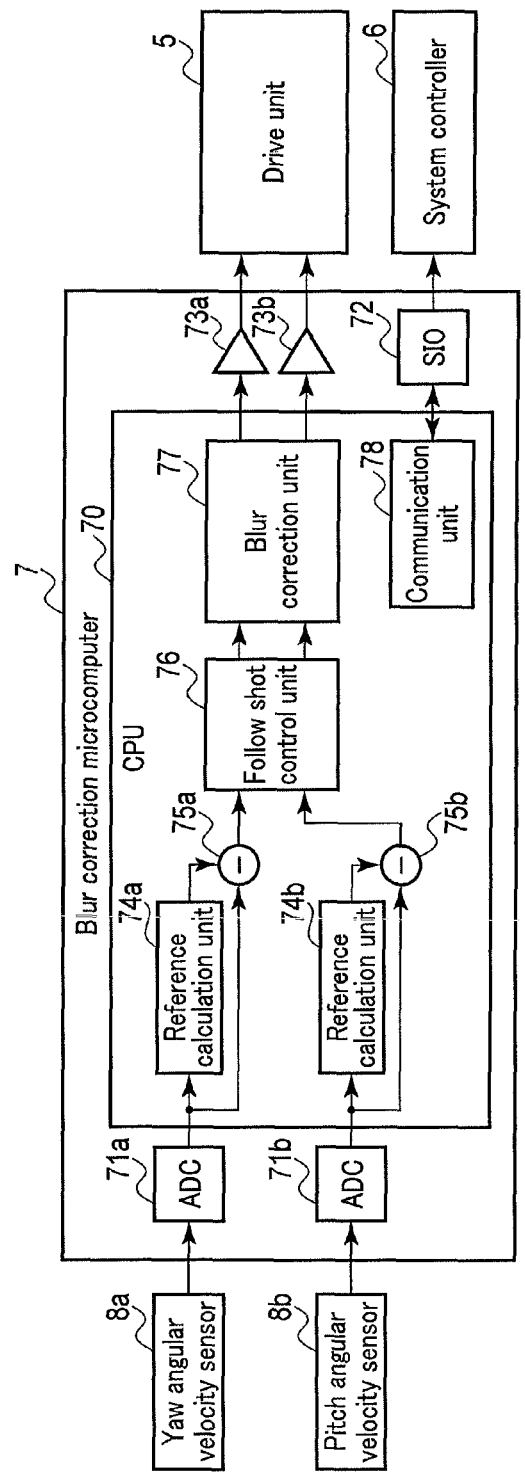
F I G. 6

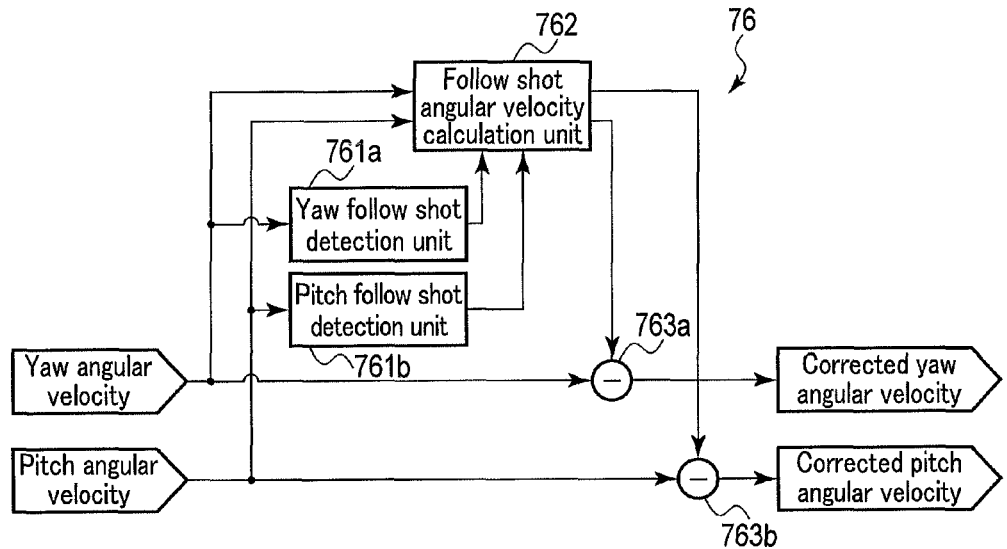
F I G. 7
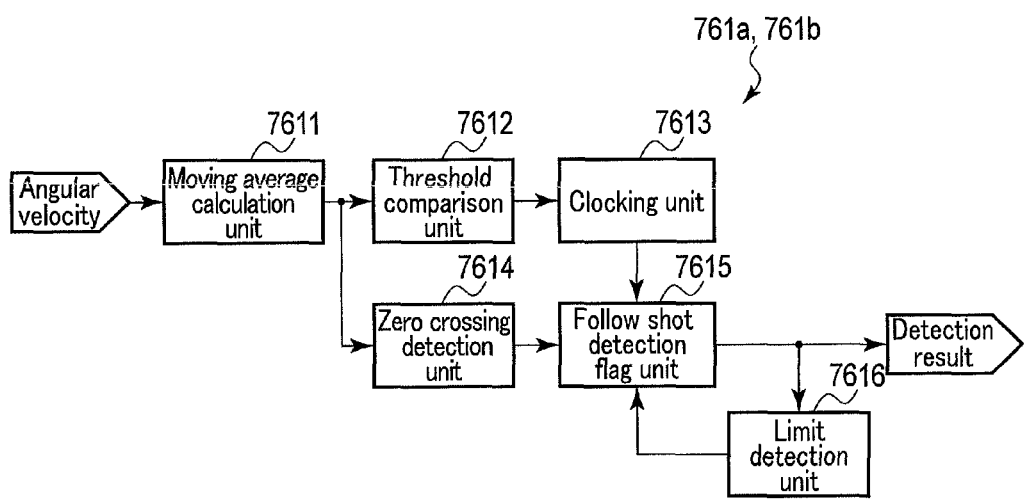
F I G. 8

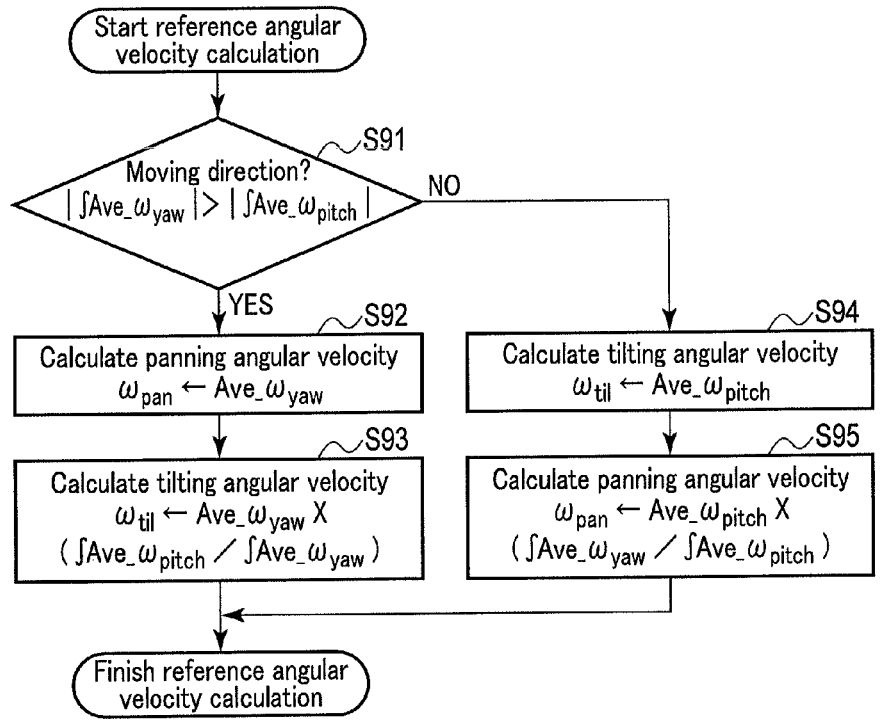
F I G. 12
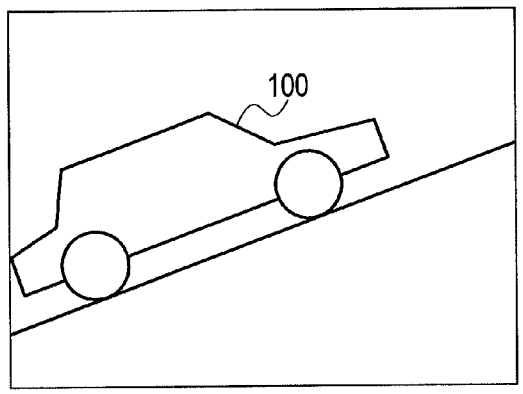
F I G. 13A

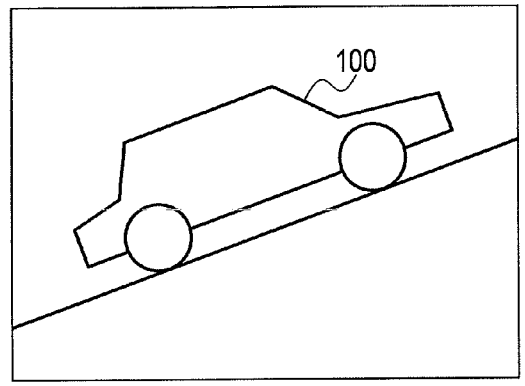
F I G. 13B
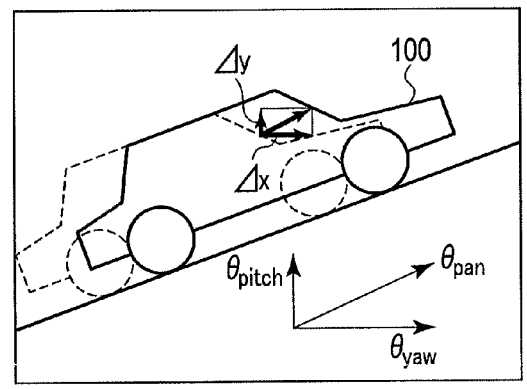
F I G. 13C
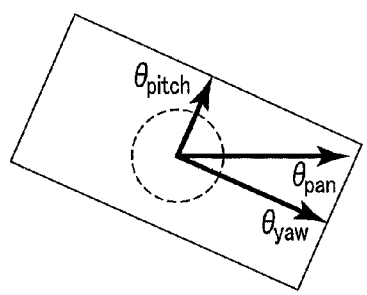
F I G. 13D

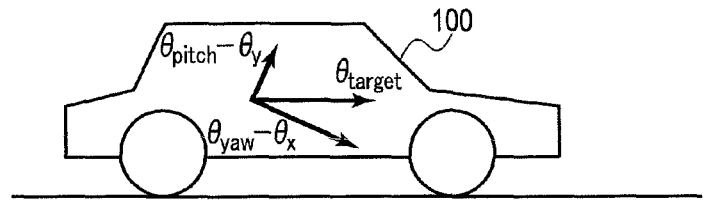
F I G. 13E
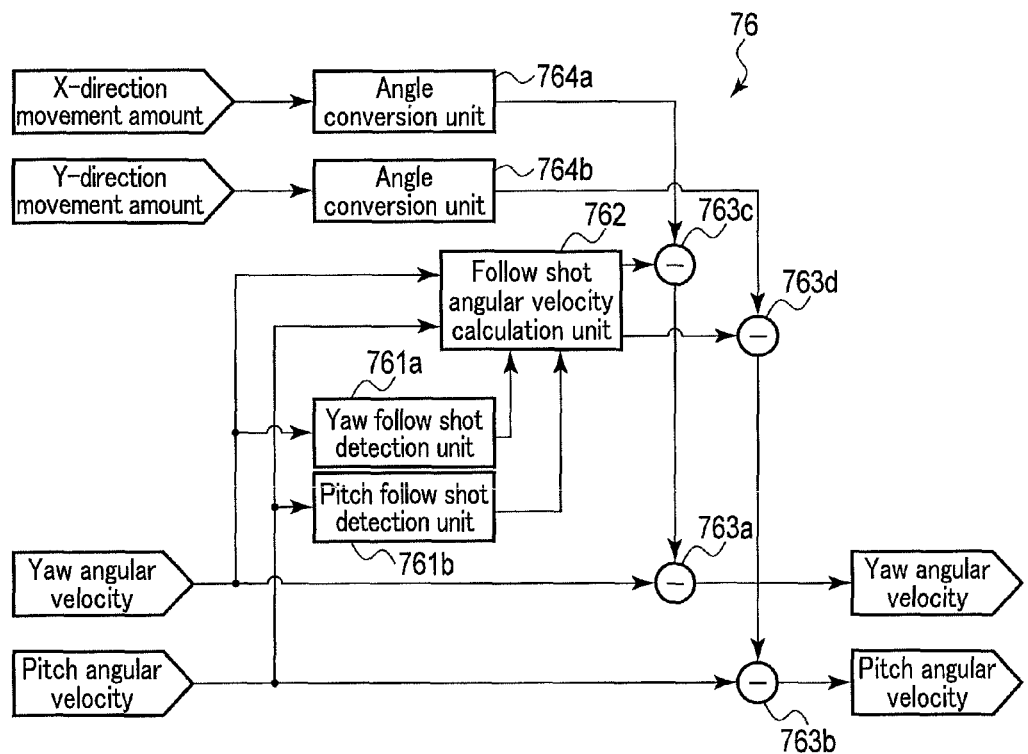
F I G. 14

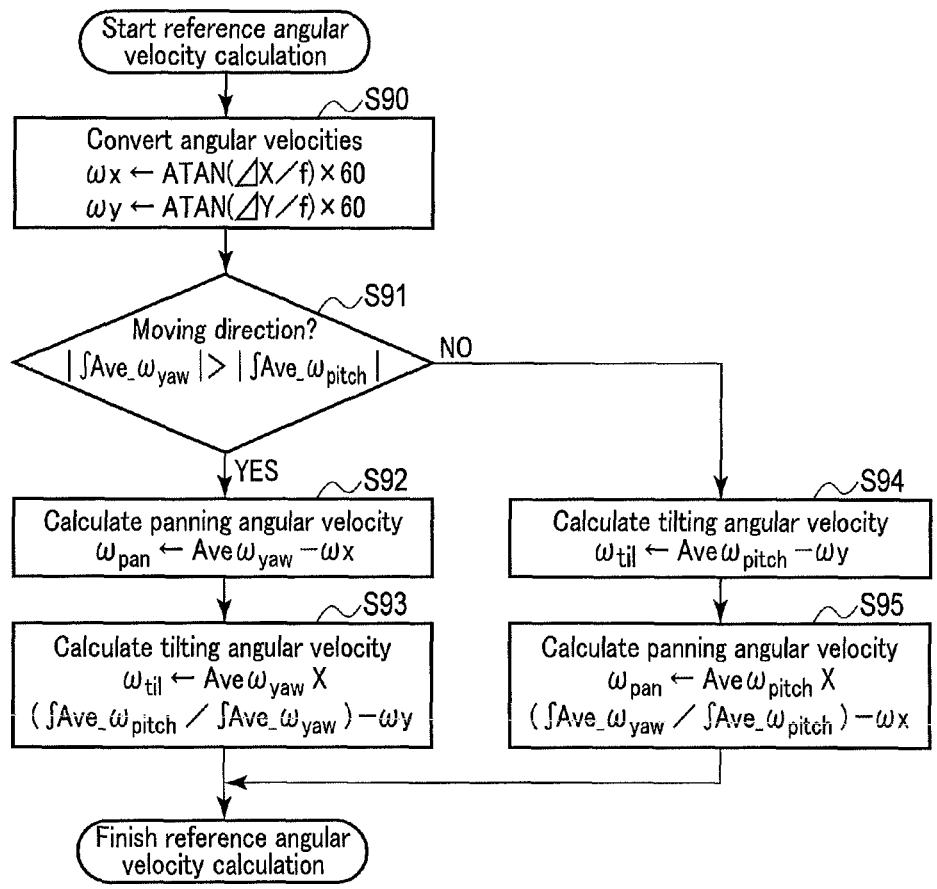
F I G. 15

IMAGING APPARATUS AND IMAGE BLUR CORRECTION METHOD

CROSS-REFERENCE TO RELATED APPLICATIONS

This application is a Continuation application of PCT Application No. PCT/JP2014/057392, filed Mar. 18, 2014 and based upon and claiming the benefit of priority from the prior Japanese Patent Application No. 2013-087689, filed Apr. 18, 2013, the entire contents of both of which are incorporated herein by reference.

BACKGROUND OF THE INVENTION

1. Field of the Invention

The present invention relates to an imaging apparatus and an image blur correction method which correct image deterioration caused by an image blur resulting from camera shake.

2. Description of the Related Art

Recently, imaging apparatuses such as a camera equipped with a camera shake correction function have been widespread. Such a camera enables photography of a satisfactory photographic image without an image blur caused by camera shake even if no attention is paid to the camera shake during hand-held photography.

Meanwhile, there is a photography method known as follow shot. According to this photography method, photography is performed along with, for example, a panning operation in a horizontal direction and a tilting operation in a vertical direction while a camera is moved in response to a moving subject. According to this photography method, the moving subject is photographed without any blur, that is, photographed as if the subject has stopped, and the background of the moving subject flows in the moving direction of this subject and thus becomes dim (blurs), so that the subject can be distinctly photographed, and the movement of the subject can be expressed.

When such a follow shot is performed with a camera in which the camera shake correction function is effective, this camera erroneously detects that the operation of moving the camera by the panning operation and the tilting operation is the occurrence of camera shake, and makes a camera shake correction in response to the camera shake detection.

Thus, the problem of an image obtained by the follow shot is that the blur of the background is eased, and the subject is blurred, so that an image which does not meet the original intention of the follow shot is photographed.

For example, Patent Jpn. Pat. Appln. KOKAI Publication No. 5-216104 shows a technique to address such a problem. In the disclosure according to Jpn. Pat. Appln. KOKAI Publication No. 5-216104, follow shot determining means and switch means are provided. The follow shot determining means has movement detection means for detecting a camera shake and then outputting a movement detection signal, a correction optical system which corrects the camera shake, and a movement drive unit which drives the correction optical system on the basis of the movement detection signal from the movement detection means. The follow shot determining means determines whether a follow shot is being performed in accordance with the characteristics of a detection signal from the movement detection means in which the high-frequency component of the movement detection signal is removed. The switch means blocks the movement detection signal when the follow shot determining means determines that the follow shot is performed. When it is determined that the follow shot is being performed, the camera shake correction of the movement drive unit is automatically stopped so that the follow shot operation is not erroneously corrected.

BRIEF SUMMARY OF THE INVENTION

An imaging apparatus according to an aspect of the invention, comprising:

an optical system which images a subject;

an image pickup device which outputs an image signal of a subject image formed by the optical system;

a first angular velocity detection unit which detects a first angular velocity for rotation in a first rotation direction around a direction perpendicular to an imaging plane of the image pickup device as a first axis;

a second angular velocity detection unit which detects a second angular velocity for rotation in a second rotation direction around a direction that intersects at right angles with the first axis on the imaging plane of the image pickup device as a second axis;

a follow shot control unit, the follow shot control unit including a follow shot detection unit which detects whether a state is a follow shot state on the basis of the first angular velocity detected by the first angular velocity detection unit and the second angular velocity detected by the second angular velocity detection unit, and an angular velocity calculation unit which calculates a panning angular velocity and a tilting angular velocity generated by the follow shot to correct the first angular velocity and the second angular velocity when the follow shot detection unit detects that the state is the follow shot state;

a blur correction unit which calculates an image blur correction amount in accordance with the first angular velocity and the second angular velocity corrected by the follow shot control unit; and a blur drive unit which drives one or both of the optical system and the image pickup device in a direction to counteract an image blur on the basis of the image blur correction amount calculated by the blur correction unit and thus corrects the image blur generated in the imaging plane of the image pickup device, wherein in the follow shot control unit, when the follow shot detection unit detects that the state is the follow shot state associated with a panning or tilting operation, the angular velocity calculation unit determines a rotation direction to be the main direction of the follow shot and an inclination angle on the basis of magnitude correlation between the absolute values of the first angular velocity and the second angular velocity, and respectively calculates, on the basis of the determination, the panning angular velocity and the tilting angular velocity to be reference angular velocities in the first or second direction based on one of the first and second angular velocities on the basis of the inclination angle immediately before exposure and the ratio between the first angular velocity and the second angular velocity, and the blur correction unit calculates the image blur correction amount on the basis of the difference between the first angular velocity and the panning angular velocity and the difference between the second angular velocity and the tilting angular velocity.

An image blur correction of an imaging apparatus according to an aspect of the invention, the imaging apparatus comprising an optical system which images a subject, and an image pickup device which outputs an image signal of a subject image formed by the optical system, the image blur correction method comprising:

detecting a first angular velocity for rotation in a first rotation direction around a direction perpendicular to an imaging plane of the image pickup device as a first axis;

detecting a second angular velocity for rotation in a second rotation direction around a direction that intersects at right angles with the first axis on the imaging plane of the image pickup device as a second axis;

detecting whether the state is a follow shot state on the basis of the first angular velocity to be detected and the second angular velocity to be detected;

calculating a panning angular velocity and a tilting angular velocity generated by the follow shot to correct and calculate the first angular velocity and the second angular velocity when the state is detected to be the follow shot state;

calculating an image blur correction amount in accordance with the first angular velocity and the second angular velocity that have been corrected and calculated; and driving one or both of the optical system and the image pickup device in a direction to counteract an image blur on the basis of the calculated image blur correction amount and thus correcting the image blur generated in the imaging plane of the image pickup device, wherein in the follow shot control, when a state is detected to be the follow shot state associated with a panning or tilting operation, a rotation direction to be the main direction of the follow shot and an inclination angle are determined on the basis of magnitude correlation between the absolute values of the first angular velocity and the second angular velocity, and on the basis of the determination, the panning angular velocity and the tilting angular velocity to be reference angular velocities in the first or second direction based on one of the first and second angular velocities are respectively calculated on the basis of the inclination angle immediately before exposure and the ratio between the first angular velocity and the second angular velocity, and in the correction of the image blur, the image blur correction amount is calculated on the basis of the difference between the first angular velocity and the panning angular velocity and the difference between the second angular velocity and the tilting angular velocity.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is an external configuration diagram showing a first embodiment of an imaging apparatus equipped with a follow shot detection function according to the present invention;

FIG. 3 is a graph showing an example of the result of integrating angular velocities ω in a yaw direction and a pitch direction in the apparatus;

FIG. 4 is a graph illustrating a detection method of the inclination of a camera body in the apparatus;

FIG. 6 is a block diagram showing the internal configuration of a blur correction microcomputer in the apparatus;

FIG. 7 is a specific block configuration diagram showing a follow shot control unit in the apparatus;

FIG. 8 is a specific block configuration diagram showing a follow shot detection unit in the apparatus;

FIG. 12 is a reference angular velocity calculation start flowchart in the same apparatus;

FIG. 13A is a schematic diagram showing a frame image of a live-view image displayed on an EVF when a camera is moved to follow a subject which moves in parallel in a second embodiment of an imaging apparatus equipped with a follow shot detection function according to the present invention;

FIG. 13B is a schematic diagram showing a frame image of a live-view image displayed on the EVF in the apparatus;

FIG. 13C is a diagram showing the movement of the subject between frames in the apparatus;

FIG. 13D is a diagram showing the state in which the subject moving in parallel is seen from the rear surface when imaged in the apparatus;

FIG. 13E is a diagram in which the movement direction of the subject is converted into a horizontal direction when a panning operation is performed while the apparatus is inclined in the detection direction of the angular velocity;

FIG. 14 is a specific block configuration diagram showing a follow shot control unit in the apparatus;

FIG. 15 is a reference angular velocity calculation start flowchart in the apparatus.

DETAILED DESCRIPTION OF THE INVENTION

First Embodiment

Figure 2:
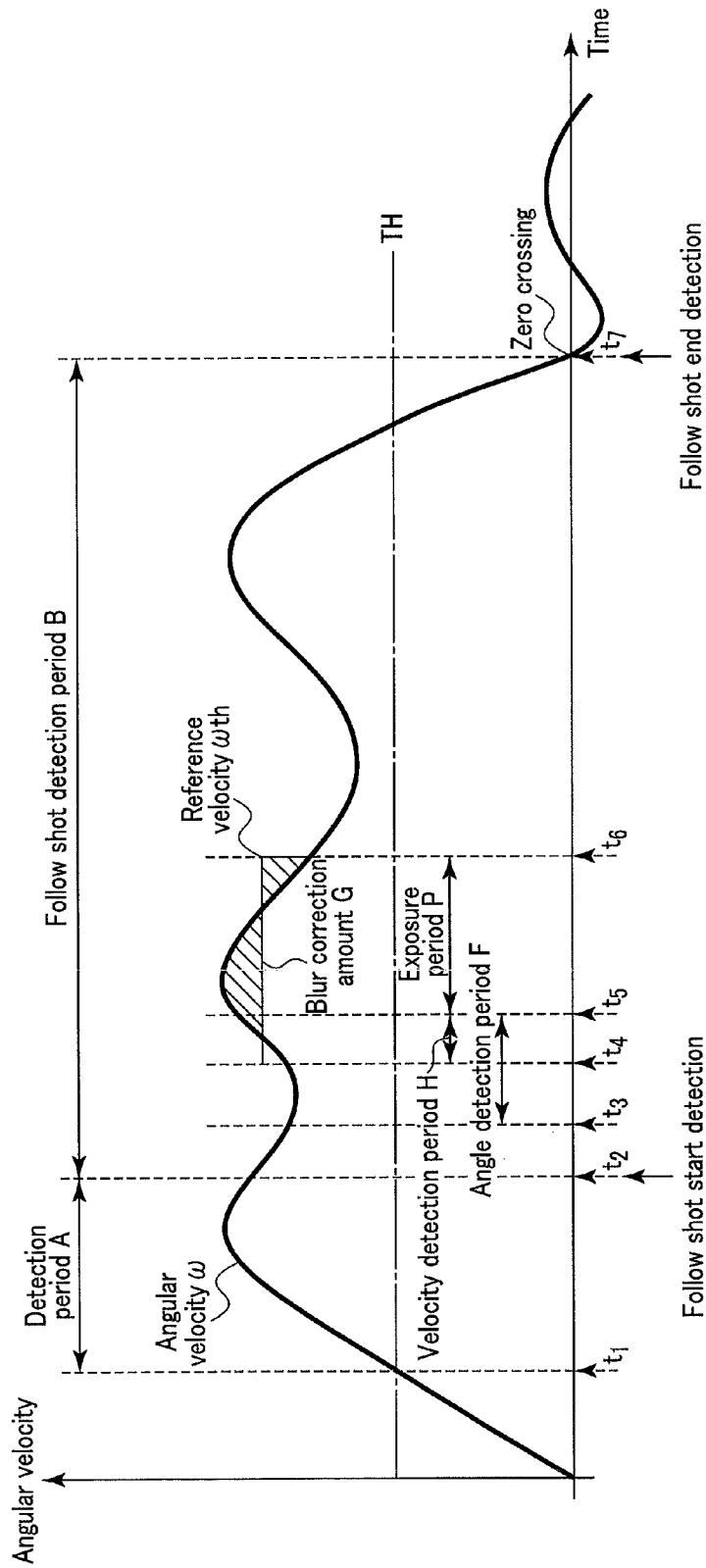
FIG. 2 is a chart showing the flow of the operation of a follow shot in the apparatus.

Hereinafter, a first embodiment of the present invention will be described with reference to the drawings.

FIG. 1 is an external configuration diagram of an imaging apparatus such as a camera equipped with a follow shot detection function. The apparatus has an optical system 2 provided on the front surface of a camera body 1, and a release switch (SW) 9 provided on the upper surface.

The movement that occurs in the camera body 1 is defined with reference to FIG. 1.

The leftward/rightward direction relative to the camera body 1 is an X-axis direction. The rightward direction from the camera body 1 in the X-axis direction is a plus (+) direction, and the leftward direction is a minus (−) direction. Thus, for convenience' sake, a movement amount in the rightward direction is a movement amount in the + direction, and a movement amount in the leftward direction is a movement amount in the − direction.

The upward/downward direction relative to the camera body 1 is a Y-axis direction. The upward direction from the camera body 1 in the Y-axis direction is a plus (+) direction, and the downward direction is a minus (−) direction. Thus, for convenience' sake, a movement amount in the upward direction is a movement amount in the + direction, and a movement amount in the downward direction is a movement amount in the − direction.

The direction of an optical axis L of the camera body 1 is a Z-axis direction. The subject direction is +, and the opposite direction is −.

The abovementioned X-axis, Y-axis, and Z-axis directions also correspond to the imaging plane of an image pickup device 4.

Relative to the camera body 1, a rotation direction around the axis in the Y-axis direction is a yaw direction (first direction), a rotation direction around the axis in the X-axis direction is a pitch direction (second direction), and a rotation direction around the axis in the Z-axis direction is a roll direction. In these directions, each arrow direction shown in the drawing is the rotation in the + direction, and the opposite direction is the rotation in the − direction.

The positive and negative (+, −) of each of the above directions depend on the mounting direction of a later-described angular velocity sensor 8, and the positive and negative of these directions are not limitations.

Next, the summary of the present apparatus are described with reference to FIG. 2 to FIG. 4.

FIG. 2 shows the flow of the operation of a follow shot in the apparatus. Specifically, the temporal transition of a rotational angular velocity component detected in accordance with the direction in which the camera is moved during the follow shot is shown.

For example, in a panning operation in which the camera is horizontally moved to perform the follow shot, an angular velocity ω occurs in the yaw direction in the camera body 1. The angular velocity ω is deflected from a stationary reference angular velocity ωzero which is an angular velocity at which the camera remains stationary.

In contrast, an angular velocity which cannot be produced by camera shake during normal hand-held photography is set as, for example, a threshold TH. The threshold TH is a value for a condition to determine that the follow shot is started when the angular velocity ω that occurs in the camera body 1 exceeds the threshold TH for a predetermined period. Although the example of the panning operation in which the camera is horizontally rotated and moved is shown above, this is not a limitation. The angular velocity in the pitch direction to be detected is also deflected from a reference angular velocity in the pitch direction in a tilting operation in which the camera is vertically shaken and thus rotated and moved.

Therefore, if the angular velocity ω that occurs in the camera body 1 continuously exceeds the threshold TH for the predetermined period, for example, for a detection period A from a time t1 at which the angular velocity ω that occurs in the camera body 1 exceeds the threshold TH in FIG. 2, it is determined that the follow shot is started from a time t2 at which the detection period A has passed.

If the angular velocity ω that occurs in the camera body 1 then becomes less than the stationary reference angular velocity ωzero, this state is defined as a zero crossing state. It is detected that the follow shot is finished at a zero crossing time t7. Thus, the period from t2 to t7 is a follow shot detection period B.

If photography is performed during the follow shot detection period B, the angular velocity ω in an angle detection period F that goes back a predetermined time from the exposure start time t5, for example, that goes back to the time t3 from the time t5 is time-integrated to acquire movement angles in the yaw direction and the pitch direction. An inclination angle of the camera body 1 is detected from the movement angles in the yaw direction and the pitch direction.

The inclination of the camera body 1 is the difference between the detection direction of the angular velocity ω and the actual moving direction of the camera body 1. For example, the inclination of the camera body 1 is the degree of a deviation from the yaw direction when the camera body 1 is moved in the leftward/rightward direction (X-axis direction). Details of this inclination detection function will be given later.

The average value of the angular velocities ω is calculated in a velocity detection period H up to the time t4 that goes back a predetermined period from the exposure start time t5.

An angular velocity ωpan of panning or an angular velocity ωtil of tilting, used for a correction during exposure, is calculated from the angular velocity ω detected in the angle detection period F from the time t3 to the time t5, and from the average value of the angular velocities ω detected in the velocity detection period H from the time t4 to the time t5. In the example described here, the camera performs a follow shot in the panning direction.

An exposure period P extends from the exposure start time t5 to the time t6. The exposure start time t5 is the time at which the release switch 9 is pressed. In the exposure period P, the angular velocity ωpan of panning is held, and the difference between the angular velocity ωpan of panning and the angular velocity ω detected by the angular velocity sensor 8 is integrated, so that a blur correction amount G during the panning indicated by the shaded part in FIG. 2 is calculated. The area of the shaded part corresponds to the blur correction amount G during the panning.

Next, a detection method of the inclination of the camera body 1 is described with reference to FIG. 3 and FIG. 4.

FIG. 3 shows an example of a temporal change regarding the results of time-integrating the angular velocities ω of the camera body 1 in the yaw direction and the pitch direction. In FIG. 3, the horizontal axis indicates the time, and the vertical axis indicates the movement amount. ∫ωyaw indicates a time integration result of an angular velocity yaw in the yaw direction. The value of this time integration result corresponds to the angle (defined as a panning angle) of movement in the yaw direction during follow shot. Similarly, ∫ωpitch indicates a time integration result of an angular velocity ωpitch in the pitch direction. This result corresponds to the angle (defined as a tilting angle) of movement in the pitch direction during follow shot.

When the camera body 1 is moved while being inclined relative to the detection direction of the angular velocity ω of the camera body 1, angular velocities ωyaw and ωpitch occur in both the yaw direction and the pitch direction, respectively. The angles θyaw and θpitch corresponding to the deviations of the detection directions of the angular velocities ω from the actual moving direction of the camera body 1 are obtained by the ratio of the results of time-integrating the angular velocities ωyaw and ωpitch.

As shown in FIG. 4, the following relational expression (1) is satisfied if a deviation angle from the yaw direction is θyaw.

$$\tan \theta_{yaw} = \int \omega_{pitch} / \int \omega_{yaw} \qquad (1)$$

Similarly, the following relational expression (2) is satisfied if a deviation angle from the pitch direction is θpitch.

$$\tan\theta pitch = f\omega yaw/f\omega pitch \qquad (2)$$

Therefore, the angular velocity ωpitch in the pitch direction can be obtained from the angular velocity ωyaw in the yaw direction by the following expression (3) below.

$$\omega pitch = f\omega pitch/f\omega yaw \times \omega yaw \qquad (3)$$

Similarly, the angular velocity ωyaw in the yaw direction can be obtained from the angular velocity in the pitch direction by the following expression (4).

$$\omega yaw = f\omega yaw/f\omega pitch \times \omega pitch \qquad (4)$$

In the present embodiment, on the basis of the higher angular velocity between the angular velocities in the yaw direction and the pitch direction, and the ratio of the integration values of the angular velocities in the yaw direction and the pitch direction, an angular velocity ω that intersects at right angles with the lager angular velocity is calculated.

The higher angular velocity is more affected by the moving attributed to the panning operation and is less affected by camera shake. Therefore, on the basis of the higher angular velocity, the angular velocity ω that intersects at right angles is obtained. As a result, the direction in which the camera body 1 is moved is accurately obtained.

Next, the configuration of the present apparatus is described with reference to FIG. 5 to FIG. 9.

Figure 5:
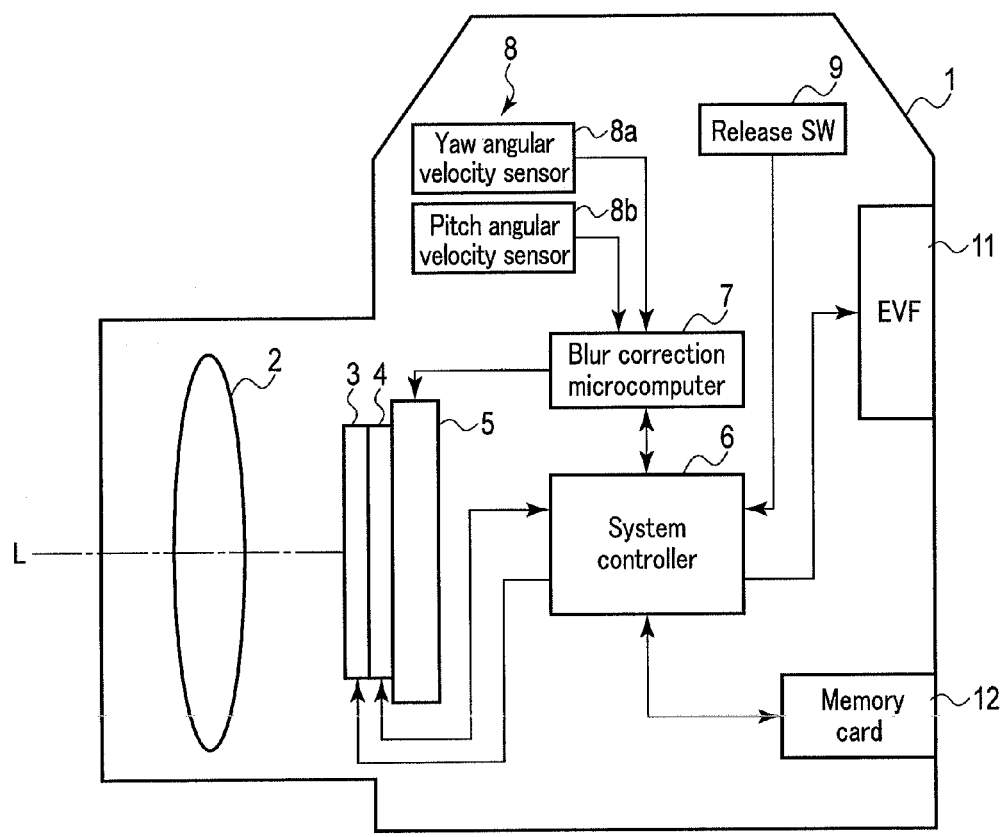
FIG. 5 is a block diagram showing the overall configuration of the apparatus.

FIG. 5 shows a block diagram of the overall configuration of the present apparatus. The camera body 1 includes the optical system 2, a focal plane shutter 3, the image pickup device 4, a drive unit 5, a system controller (control unit) 6, a blur correction microcomputer 7, the angular velocity sensor 8, the release SW 9, an electronic viewfinder (EVF) 11, and a memory card 12 as a storage medium.

The optical system 2 forms a subject image, based on an external light flux entering from the direction along the optical axis L, on an imaging plane of the image pickup device 4.

The focal plane shutter 3 is disposed in front of the image pickup device 4 and opens or closes to bring the image pickup device 4 into an exposure state or a light-shielding state.

The image pickup device 4 converts the subject image formed on the imaging plane into an electric signal on the basis of an instruction from the system controller 6, and reads this converted electric signal as a video signal.

The system controller 6 performs control regarding the various functions of the overall camera. As the basic functions of the camera, the system controller 6 reads the video signal from the image pickup device 4, converts the read video signal into an image signal that can be displayed on the EVF 11 and then displays the image on the EVF 11, and records the video signal read at the time of photography in the memory card 12 as a photographic image on the basis of the detection from the release SW 9. The system controller 6 communicates with the blur correction microcomputer 7. Although the system controller 6 also has various other functions, the control related to the present invention is only described here.

The EVF 11 includes a liquid crystal panel. The EVF 11 displays the image based on the video signal output from the system controller 6 on the liquid crystal panel so that a user can recognize the image based on the video signal.

The release SW 9 detects each of release operations: a half press (1st release) and a full press (2nd release) which are actions taken by the user to perform a photographic operation, and the release SW 9 outputs detection signals of these release operations to the system controller 6.

The memory card 12 is a nonvolatile memory to record photographic images. The memory card 12 is attachable to and detachable from the camera body 1.

Next, the main components of the present invention are described.

The drive unit 5 supports the image pickup device 4, and drives the image pickup device 4 to move in the X-axis direction and the Y-axis direction on the basis of an instruction issued from the blur correction microcomputer 7.

The angular velocity sensor 8 detects, for example, each of the rotational movements in the yaw direction and the pitch direction. The angular velocity sensor 8 includes, for example, a yaw angular velocity sensor (first angular velocity detection unit) 8a and a pitch angular velocity sensor (second angular velocity detection unit) 8b that are provided in different mounting directions.

The yaw angular velocity sensor 8a detects a first angular velocity for rotation in the yaw direction around a first perpendicular direction as a first axis which is perpendicular to the direction of the optical axis L of the optical system 2. The yaw angular velocity sensor 8a detects an angular change in the yaw direction as the angular velocity ωyaw, and outputs an analog angular velocity detection signal to the blur correction microcomputer 7.

The pitch angular velocity sensor 8b detects a second angular velocity for rotation in the pitch direction around a direction that intersects at right angles with both the optical axis L and the first axis as a second axis. The pitch angular velocity sensor 8b detects an angular change in the pitch direction as the angular velocity ωpitch, and outputs an analog angular velocity detection signal to the blur correction microcomputer 7. A roll angular velocity sensor which detects an angular change in the roll direction as the angular velocity ωroll may be provided.

The blur correction microcomputer 7 calculates blur amounts generated in the imaging plane from the angular velocity detection signals in the yaw direction and the pitch direction output from the angular velocity sensor 8 on the basis of an instruction issued from the system controller 6. The blur correction microcomputer 7 issues, to the drive unit 5, a drive instruction to move in a direction to counteract the blur amounts, that is, a drive instruction corresponding to the blur correction amount G shown in FIG. 2. Therefore, the drive unit 5 drives the image pickup device 4 in a direction to counteract the blur in the imaging plane, so that blurring in the photographic image is prevented. Although the drive unit 5 drives the image pickup device 4 in the direction to counteract the blur, the drive unit 5 may drive the optical system 2.

FIG. 6 shows a block diagram of the internal configuration of the blur correction microcomputer 7.

The blur correction microcomputer 7 includes a CPU 70, two ADCs 71a and 71b, and SIO 72, and two drivers 73a and 73b. The CPU 70 includes therein reference calculation units 74a and 74b, two subtraction units 75a and 75b, a follow shot control unit 76, a blur correction unit 77, and a communication unit 78, as processing functions of a control program to perform blur correction control.

The two ADCs 71a and 71b respectively convert the analog angular velocity detection signals output from the angular velocity sensor 8 into digital signals. The ADC 71a converts the angular velocity detection signal output from the yaw angular velocity sensor 8a into a digital signal. The ADC 71*b* converts the angular velocity detection signal output from the pitch angular velocity sensor 8*b* into a digital signal.

Each of the ADCs 71*a* and 71*b* converts the analog angular velocity detection signal into a digital signal at intervals of 1 msec, for example, at a sampling rate of 1 kHz. The sampling rate is not particularly limited to this rate value, and a higher rate enables more accurate detection. The sampling rate has only to be set to an optimum rate in accordance with the performance of a system.

The SIO 72 forms a serial interface between the CPU 70 and an external device. The SIO 72 performs a communication between the CPU 70 and the external device, for example, exchanges commands between the CPU 70 and the system controller 6.

The two drivers 73*a* and 73*b* respectively output drive signals to drive the drive unit 5 on the basis of the blur correction amounts G (Gy, Gp) calculated by the CPU 70, for example, in the yaw direction and the pitch direction. The driver 73*a* outputs a drive signal based on the blur correction amount G (Gy) in the yaw direction. The driver 73*b* outputs a drive signal based on the blur correction amount G (Gp) in the pitch direction.

The CPU 70 executes a program for blur correction amount calculation, acquires each of the angular velocity detection signals in the yaw direction and the pitch direction respectively output from the angular velocity sensors 8*a* and 8*b*, calculates each of blur amounts in the yaw direction and the pitch direction generated in the imaging plane of the image pickup device 4, and calculates the blur correction amount G for moving in directions opposite to the blur amounts.

The program for blur correction amount calculation enables the following functions to be achieved by the CPU 70 of the imaging apparatus including the optical system 2 which images the subject and the image pickup device 4 which outputs an image signal from an optical image formed by the optical system 2: a function to detect the angular velocity ωyaw for rotation in the yaw direction; a function to detect the angular velocity ωpitch for rotation in the pitch direction; a function to judge whether the state is a follow shot state on the basis of the angular velocity ωyaw in the yaw direction and the angular velocity ωpitch in the pitch direction; a function to drive one or both of the optical system 2 and the image pickup device 4 to make a correction for eliminating an image blur caused during the follow shot; a function to calculate a panning angular velocity ωpan in the yaw direction and a tilting angular velocity ωtil in the pitch direction associated with the camera operation of the follow shot on the basis of the ratio between the angular velocity ω of strong shaking immediately before photography, the angular velocity ωyaw in the yaw direction, and the angular velocity ωpitch in the pitch direction when the follow shot is detected; and a function to calculate the blur correction amounts G (Gy, Gp) on the basis of the difference between the angular velocity ωyaw in the yaw direction and the angular velocity ωpitch in the pitch direction, the panning angular velocity ωpan, and the tilting angular velocity ωtil.

The reference calculation unit 74*a* acquires the angular velocity detection signal output from the angular velocity sensor 8*a* in the yaw direction, and obtains the value of the angular velocity ωyaw in a condition in which the rotational movement in the yaw direction is stopped, as a reference value.

The reference calculation unit 74*b* acquires the angular velocity detection signal output from the angular velocity sensor 8*b* in the pitch direction, and obtains the value of the angular velocity ωpitch in a condition in which the rotational movement in the pitch direction is stopped, as a reference value.

The reference values (stationary angular velocity reference values) of the angular velocities ωyaw and ωpitch at a stationary time are calculated for the following purposes.

The output of angular velocity detection detected by the angular velocity sensor at the stationary time is originally zero, but may actually include an offset component of a direct-current component in a sensor output. Therefore, to detect the correct angular velocity, the stationary angular velocity reference values corresponding to the offset component are subtracted from the value of the actually detected angular velocity to perform compensation.

Both the stationary angular velocity reference values in the yaw direction and the pitch direction can be calculated by taking average values of sufficiently long periods (about several seconds), but are not exclusively found in this manner and may be found by various methods. For example, the same advantageous effects are also obtained by low pass filter (LPF) processing for only extracting a low-frequency component of the angular velocity signal. Similar advantageous effects are also obtained if the direct-current component is removed by high pass filter (HPF) processing for only extracting an alternating-current component including the subtraction units 75*a* and 75*b* from the angular velocity detection signal.

Each of the two subtraction units 75*a* and 75*b* subtracts each of the reference values respectively calculated by the reference calculation units 74*a* and 74*b* from the angular velocity detection signals respectively output from the angular velocity sensors 8*a* and 8*b*. The subtraction unit 75*a* subtracts the reference value in the yaw direction calculated by the reference calculation unit 74*a* from the angular velocity detection signal (angular velocity ωyaw) output from the angular velocity sensor 8*a* in the yaw direction. The subtraction unit 75*b* subtracts the reference value in the pitch direction calculated by the reference calculation unit 74*b* from the angular velocity detection signal (angular velocity ωpitch) output from the angular velocity sensor 8*b* in the pitch direction.

Each of the reference values is thus subtracted from each of the angular velocities ωyaw and ωpitch so that each of the angular velocities ωyaw and ωpitch will be an angular velocity having a sign (+, −). The signs (+, −) can be treated as the rotational directions of the detected angular velocities ωyaw and ωpitch.

The follow shot control unit 76 determines whether the state is a follow shot state on the basis of the angular velocity ωyaw in the yaw direction detected by the angular velocity sensor 8*a* and the angular velocity ωpitch in the pitch direction detected by the angular velocity sensor 8*b*.

Specifically, the follow shot control unit 76 loads the subtraction signal in the yaw direction output from the subtraction unit 75*a*, that is, the angular velocity ωyaw having the sign (+, −) and the subtraction signal in the pitch direction output from the subtraction unit 75*b*, that is, the angular velocity ωpitch having the sign (+, −), and determines by the angular velocities ωyaw and ωpitch that the follow shot is started. When it is determined that photography is started during the follow shot, the follow shot control unit 76 outputs each of corrected angular velocities ωstabyaw and ωstabpitch in which the panning angular velocity ωpan and the tilting angular velocity ωtil related to the follow shot are respectively removed from the angular velocities ωyaw and ωpitch.

The blur correction unit 77 integrates each of the corrected angular velocities ωstabyaw and ωstabpitch output from the follow shot control unit 76 to obtain each angular change, and calculates blur amounts generated in the imaging plane of the image pickup device 4 from the angular changes and the focal distance of the optical system 2. The blur correction unit 77 then obtains the blur correction amounts G (Gy, Gp) in the yaw direction and the pitch direction to offset the blur amounts, and issues a drive instruction corresponding to the blur correction amounts G (Gy, Gp) to the drive unit 5 the drivers 73a and 73b, respectively. There are various methods of calculating the blur correction amounts G (Gy, Gp), thus the blur correction amounts G (Gy, Gp) have only to be calculated by one of the calculation methods.

Next, the configuration of the follow shot control unit 76 is described.

FIG. 7 shows a specific block configuration diagram of the follow shot control unit 76. The follow shot control unit 76 includes two follow shot detection units 761a and 761b, a follow shot angular velocity calculation unit 762, and two subtraction units 763a and 763b.

The follow shot detection unit 761a inputs the angular velocity ωyaw in the yaw direction having the sign (+, −) output from the subtraction unit 75a, checks whether the angular velocity ωyaw has continuously exceeded the threshold TH for the detection period A on the basis of the angular velocity ωyaw as shown in FIG. 2, and detects whether the follow shot operation is being performed.

The follow shot detection unit 761b inputs the angular velocity ωpitch in the pitch direction having the sign (+, −) output from the subtraction unit 75b, checks whether the angular velocity ωpitch has continuously exceeded the threshold TH for the detection period A on the basis of the angular velocity ωpitch as shown in FIG. 2, and detects whether the follow shot operation is being performed.

If photography is started while the follow shot is detected by one of the follow shot detection units 761a and 761b, the follow shot angular velocity calculation unit 762 calculates the panning angular velocity ωpan in the yaw direction and the tilting angular velocity ωtil in the pitch direction on the basis of the angular velocities ωyaw and ωpitch for a predetermined period immediately before photography. The panning angular velocity ωpan and the tilting angular velocity ωtil occur due to the follow shot.

The subtraction unit 763a receives the angular velocity ωyaw in the yaw direction having the sign (+, −) output from the subtraction unit 75a, subtracts the panning angular velocity ωpan calculated by the follow shot angular velocity calculation unit 762 from the angular velocity ωyaw in the yaw direction, and calculate an angular velocity to be corrected, that is, the correction angular velocity ωstabyaw in the yaw direction.

The subtraction unit 763b receives the angular velocity ωpitch in the pitch direction having the sign (+, −) output from the subtraction unit 75b, subtracts the tilting angular velocity ωtil calculated by the follow shot angular velocity calculation unit 762 from the angular velocity ωpitch in the pitch direction, and calculate an angular velocity to be corrected, that is, the correction angular velocity ωstabpitch.

Next, the specific configuration of each of the follow shot detection units 761a and 761b is described with reference to a block configuration diagram shown in FIG. 8.

Each of the follow shot detection units 761a and 761b has the same configuration, and includes a moving average calculation unit 7611, a threshold comparison unit 7612, a clocking unit 7613, a zero crossing detection unit 7614, a follow shot detection flag unit 7615, and a limit detection unit 7616.

The moving average calculation unit 7611 sequentially receives the angular velocities ωyaw in the yaw direction having the sign (+, −) output from the subtraction unit 75a, and calculates a moving average value Aveωyaw of the angular velocities ωyaw in the yaw direction on the basis of sampling values immediately before each of the angular velocities ωyaw.

The moving average calculation unit 7611 sequentially receives the angular velocities ωpitch in the pitch direction having the sign (+, −) output from the subtraction unit 75b, and calculates a moving average value Aveωpitch of the angular velocities ωpitch in the pitch direction on the basis of sampling values immediately before each of the angular velocities ωpitch.

No moving average calculation unit 7611 may be provided. However, the provision of the moving average calculation unit 7611 enables the follow shot to be stably detected even if noise resulting from various external factors such as an impact during the operation of the shutter is generated.

The threshold comparison unit 7612 compares the moving average value Aveωyaw of the angular velocities ωyaw in the yaw direction calculated by the moving average calculation unit 7611 with the threshold TH in the yaw direction, and determines whether the moving average value Aveωyaw of the angular velocities ωyaw in the yaw direction has exceeded the threshold TH in the yaw direction.

The threshold comparison unit 7612 compares the moving average value Aveωpitch of the angular velocities ωpitch in the pitch direction calculated by the moving average calculation unit 7611 with the threshold TH in the pitch direction, and determines whether the moving average value Aveωpitch of the angular velocities ωpitch in the pitch direction has exceeded the threshold TH in the pitch direction.

Each of the thresholds TH in the yaw direction and the pitch direction is set to an angular velocity ω of, for example, about 10 deg/s which does not occur in normal hand-held photography. This angular velocity ω may be a fixed value or may be changed in accordance with, for example, the focal distance of the optical system 2 and thereby enables detection suited to a photographic field angle.

The clocking unit 7613 measures the period in which the moving average value Aveωyaw of the angular velocities ωyaw in the yaw direction or the moving average value Aveωpitch of the angular velocities ωpitch in the pitch direction is determined to have exceeded each of the thresholds TH in the yaw direction and the pitch direction from the result of the comparison by the threshold comparison unit 7612. The clocking unit 7613 then determines whether the measured period has exceeded the predetermined detection period A. If the measured period exceeds the detection period A, the clocking unit 7613 detects that the follow shot is started from the point of the excess.

The zero crossing detection unit 7614 receives the moving average value Aveωyaw of the angular velocities ωyaw in the yaw direction or the moving average value Aveωpitch of the angular velocities ωpitch in the pitch direction calculated by the moving average unit 7611, and determines whether the moving average value Aveωyaw of the angular velocities ωyaw in the yaw direction or the moving average value Aveωpitch of the angular velocities ωpitch in the pitch direction has crossed zero. The zero crossing is determined by whether the sign (+, −) of the moving average value Aveωyaw or Aveωpitch of the angular velocity has been inverted or has become the value "0".

If the start of the follow shot is detected by the clocking unit 7613, the follow shot detection flag unit 7615 sets a flag (follow shot flag) at the time of the detection. If the zero crossing is detected by the zero crossing detection unit 7614, the follow shot detection flag unit 7615 clears the follow shot flag at the detection of the zero crossing. That is, the period from the setting of the follow shot flag to its clearance is the follow shot detection period B, and the follow shot operation is performed in this period B.

The limit detection unit 7616 performs a clocking operation in the follow shot detection period B in which the follow shot flag is set, and clears the follow shot flag if the period clocked by the clocking operation exceeds a preset given period. Thus, even if the reference calculation units 74a and 74b calculate erroneous references, the continuation of erroneous detection of the follow shot can be prevented.

Figure 9:
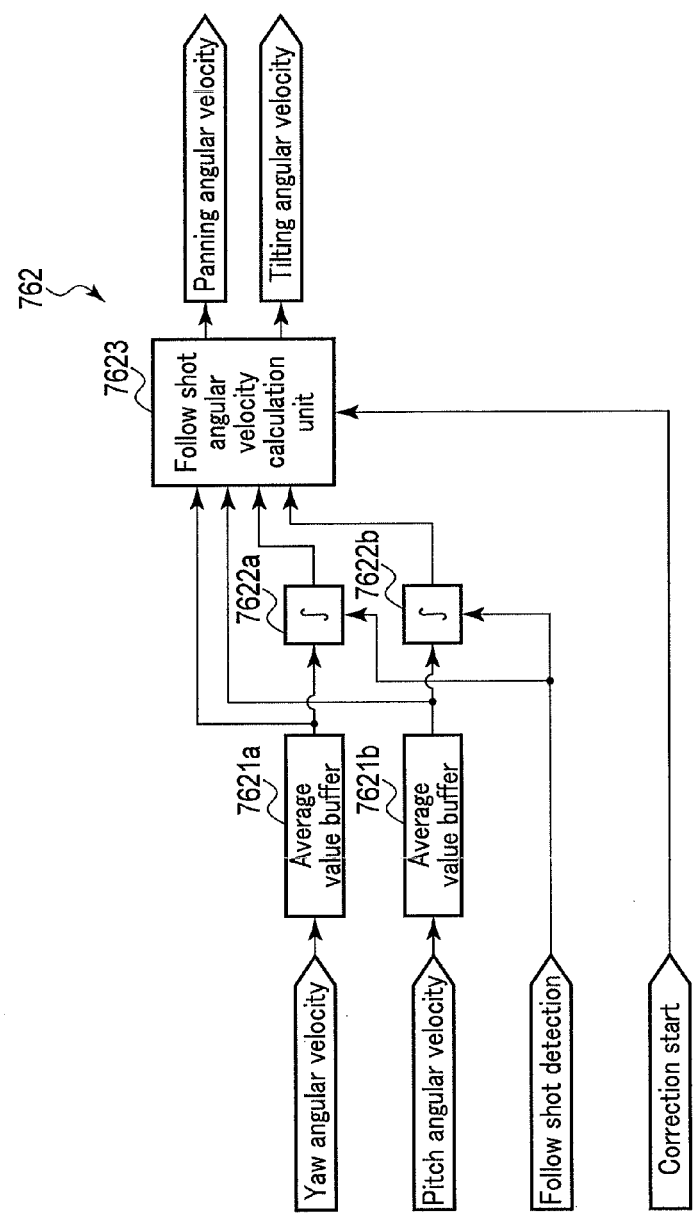
FIG. 9 is a specific block configuration diagram showing an offset detection unit in the apparatus.

Next, the specific configuration of the follow shot angular velocity calculation unit 762 is described with reference to a block configuration diagram shown in FIG. 9.

The follow shot angular velocity calculation unit 762 includes two average value buffers 7621a and 7621b, two integration units 7622a and 7622b, and a follow shot angular velocity calculation unit 7623.

The average value buffer 7621a receives the angular velocities ωyaw in the yaw direction having the sign (+, −) output from the subtraction unit 75a, and holds the average values of the angular velocities ωyaw in a given period. The average value buffer 7621a holds, for example, 8 pieces of data regarding 8-period average values every 8 periods from the latest.

Similarly, the average value buffer 7621b receives the angular velocities ωpitch in the pitch direction having the sign (+, −) output from the subtraction unit 75b, and holds the average values of the angular velocities ωpitch in a given period.

Each of the average value buffers 7621a and 7621b holds, but not exclusively, 8 pieces of data regarding 8-period average values every 8 periods from the latest, and may hold other data quantities.

The integration unit 7622a sequentially acquires and integrates 8 pieces of data regarding the average values calculated and held by the average value buffer 7621a.

The integration unit 7622b sequentially acquires and integrates 8 pieces of data regarding the average values calculated and held by the average value buffer 7621b.

Each of the average values Aveωyaw and Aveωpitch of the angular velocities ωyaw and ωpitch in the yaw direction and the pitch direction is the average value of the latest 8 pieces of data on each of the angular velocities ωyaw and ωpitch. Thus, regarding the latest 16 pieces of data, data of every 8 cycles are used, so that the ratio of the integration values of the angular velocities ωyaw and ωpitch in the yaw direction for a long period can be obtained with a smaller quantity of data. The period for obtaining this ratio serves to remove the influence of the camera shake to obtain the ratio between the angular velocity ωyaw in the yaw direction and the angular velocity ωpitch in the pitch direction, and has only to be a period in which the camera shake component can be removed.

The follow shot angular velocity calculation unit 7623 obtains the ratio between the integration value of the angular velocity ωyaw in the yaw direction calculated by the integration unit 7622a and the integration value of the angular velocity ωpitch in the pitch direction calculated by the integration unit 7622b, and the magnitude correlation of absolute values between the integration value of the angular velocity ωyaw and the integration value of the angular velocity ωpit to calculate a panning angular velocity in the yaw direction and a tilting angular velocity in the pitch direction.

In the calculation of the panning angular velocity ωpan and the tilting angular velocity ωtil, the integration value of the angular velocity ωyaw in the yaw direction is compared with the integration value of the angular velocity ωpitch in the pitch direction. On the basis of the angular velocity in the direction corresponding to one of the integration values which has a higher absolute value, that is, the yaw direction or the pitch direction in which the camera body 1 is strongly shaken, the other angular velocity is calculated.

In this way, it is possible to accurately calculate the angular velocity ωpan or ωtil by the panning or tilting in which the influence of the camera shake is removed.

In this case, if the average value of the integration values of the angular velocities ωyaw in the yaw direction is higher, the follow shot angular velocity calculation unit 7623 outputs, as the panning angular velocity ωpan in the yaw direction without modification, the latest average value of the angular velocities ωyaw in the yaw direction output from the average value buffer 7621a.

Regarding the pitch direction, the follow shot angular velocity calculation unit 7623 calculates the tilting angular velocity ωtil in the pitch direction on the basis of the above expression (3) from the latest average value of the angular velocities ωyaw in the yaw direction output from the average value buffer 7621a, the integration value of the angular velocity ωyaw in the yaw direction, and the angular velocity ωpitch in the pitch direction.

In contrast, if the average value of the integration values of the angular velocities ωpitch in the pitch direction is higher, the follow shot angular velocity calculation unit 7623 uses, as the tilting angular velocity ωtil in the pitch direction without modification, the latest average value of the angular velocities ωpitch in the pitch direction output from the average value buffer 7621b.

Regarding the yaw direction, the follow shot angular velocity calculation unit 7623 calculates the panning angular velocity ωpan in the yaw direction on the basis of the above expression (4) from the latest average value of the angular velocities ωpitch in the pitch direction output from the average value buffer 7621b, the integration value of the angular velocity ωyaw in the yaw direction, and the integration value of the angular velocity ωpitch in the pitch direction.

Next, the operation of the apparatus having the above configuration is described with reference to FIG. 10 to FIG. 12.

Figure 10:
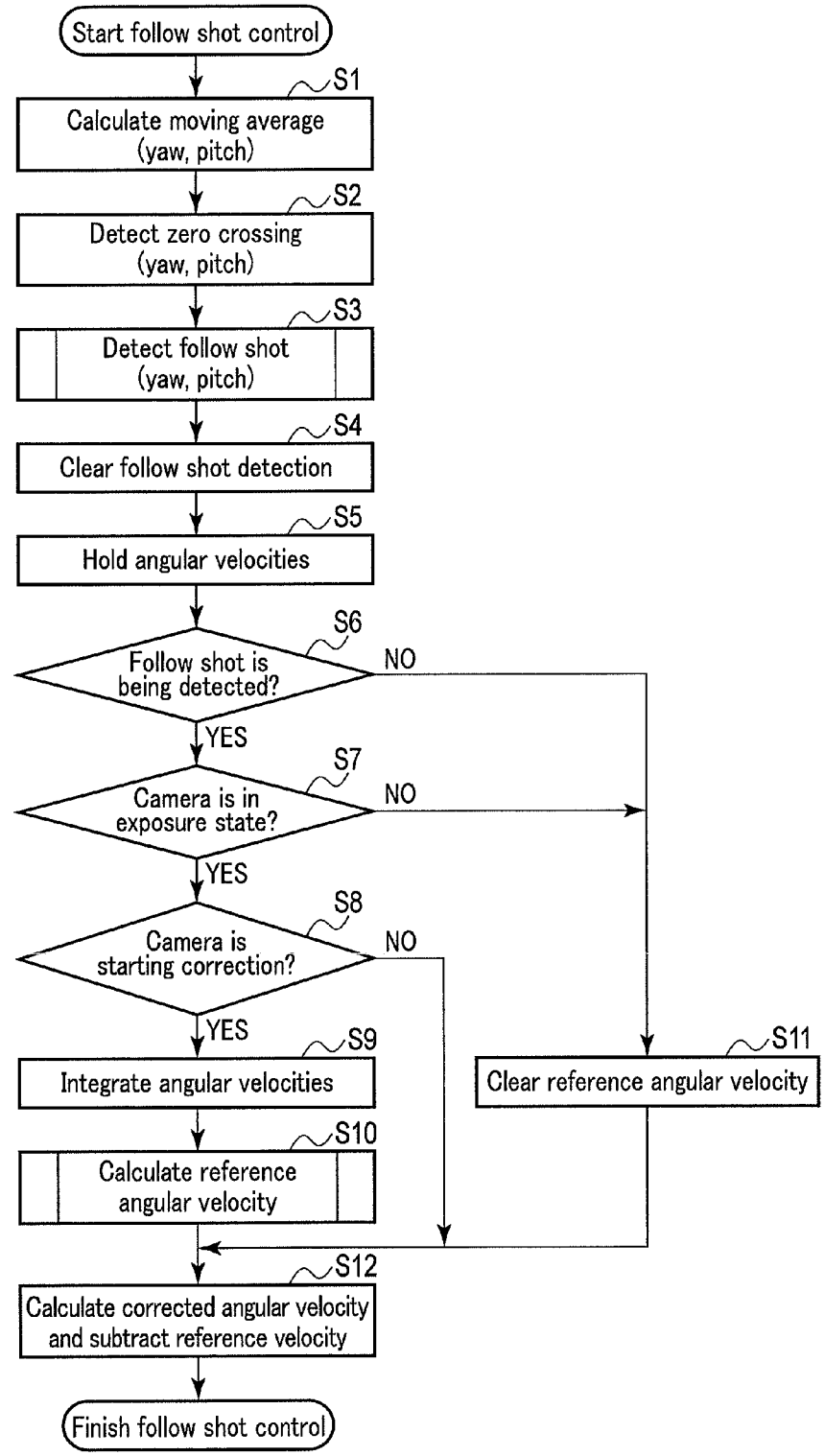
FIG. 10 is a follow shot control start flowchart of the apparatus.
Figure 11:
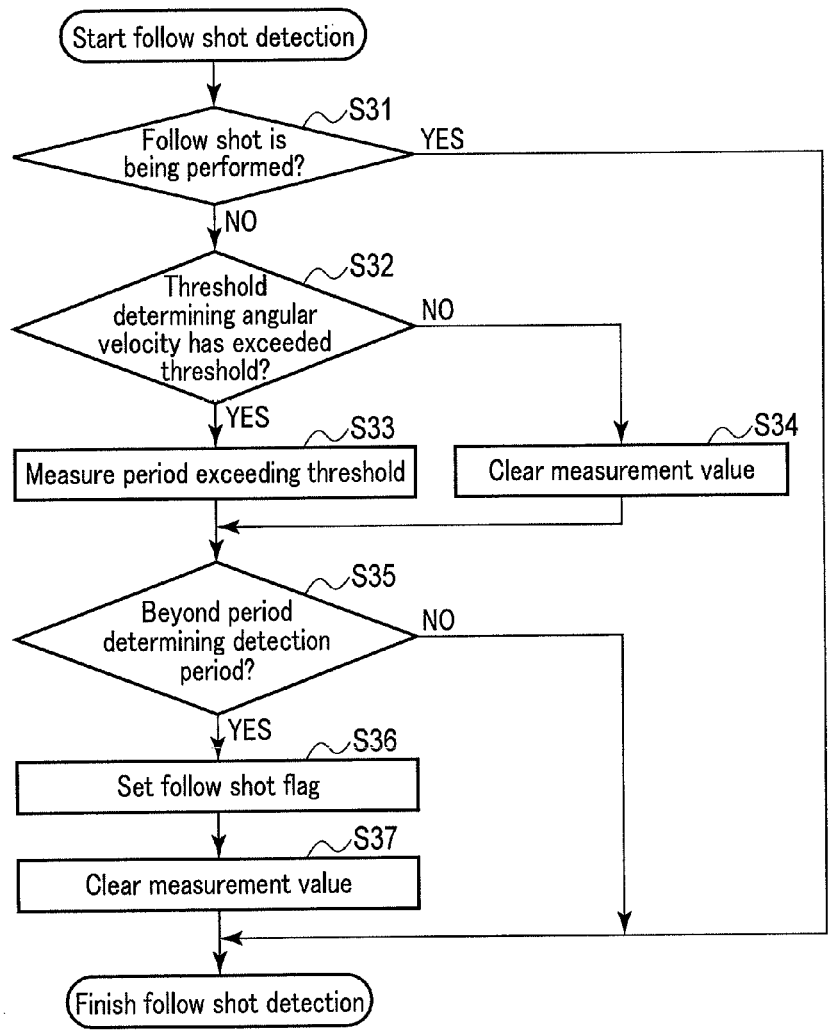
FIG. 11 is a follow shot detection processing control flowchart in the apparatus.

FIG. 10 is a flowchart showing the flow of the control of the follow shot control unit.

In step S1, the moving average calculation unit 7611 of the follow shot detection unit 761a sequentially receives the angular velocities ωyaw in the yaw direction having the sign (+, −) output from the subtraction unit 75a, and calculates a moving average value Aveωyaw of the angular velocities ωyaw in the yaw direction on the basis of sampling values immediately before each of the angular velocities ωyaw.

In the same step S1, the moving average calculation unit 7611 sequentially receives the angular velocities ωpitch in the pitch direction having the sign (+, −) output from the subtraction unit 75b, and calculates a moving average value Aveωpitch of the angular velocities ωpitch in the pitch direction on the basis of sampling values immediately before each of the angular velocities ωpitch.

In step S2, the zero crossing detection unit 7614 receives the average value Aveωyaw of the angular velocities ωyaw in the yaw direction calculated by the moving average calculation unit 7611, and determines whether the average value Aveωyaw of the angular velocities ωyaw in the yaw direction has crossed zero.

In the same step S2, the zero crossing detection unit 7614 also receives the average value Aveωpitch of the angular velocities ωpitch in the pitch direction calculated by the moving average calculation unit 7611, and determines whether the average value Aveωpitch of the angular velocities ωpitch in the pitch direction has crossed zero.

The zero crossing is determined by whether the sign (+, −) of the angular velocity ωyaw or ωpitch has been inverted or has become the value "0". Regarding the yaw direction, the zero crossing is considered to have occurred and a zero crossing flag is set when the sign (+, −) of the previously calculated average value Aveωyaw of the angular velocities ωyaw in the yaw direction is different from the sign (+, −) of the currently calculated average value Aveωyaw of the angular velocities ωyaw in the yaw direction or when the currently calculated average value Aveωyaw of the angular velocities ωyaw in the yaw direction is "0".

Regarding the pitch direction, the zero crossing is considered to have occurred and a zero crossing flag is set when the sign (+, −) of the previously calculated average value Aveωpitch of the angular velocities ωpitch in the pitch direction is different from the sign (+, −) of the currently calculated average value Aveωpitch of the angular velocities ωpitch in the pitch direction or when the currently calculated average value Aveωpitch of the angular velocities ωpitch in the pitch direction is "0".

In step S3, the follow shot detection unit 761a receives the angular velocity ωyaw in the yaw direction having the sign (+, −) output from the subtraction unit 75a, and detects on the basis of the angular velocity ωyaw whether the follow shot operation is performed. If the start of the follow shot is detected, the follow shot detection unit 761a sets a follow shot flag.

In the same step S3, the follow shot detection unit 761b inputs the angular velocity ωpitch in the pitch direction having the sign (+, −) output from the subtraction unit 75b, and detects on the basis of the angular velocity ωpitch whether the follow shot operation is performed. If the start of the follow shot is detected, the follow shot detection unit 761b sets a follow shot flag.

Details of the operations of the follow shot detection units 761a and 761b will be described later.

In step S4, each of the follow shot detection units 761a and 761b clears the follow shot flag if there is any cause for clearing the follow shot flag. The cause for clearing the follow shot flag is the setting of the zero crossing flag or the continuous setting of the follow shot flag for a predetermined time or more. The predetermined time is, for example, 10 seconds, and is set to a time longer than the time in which the follow shot is normally continued.

In step S5, the predetermined number of average values of the angular velocities ωyaw in the yaw direction calculated by the average value buffer 7621a of the follow shot angular velocity calculation unit 762 and the predetermined number of average values of the angular velocities ωpitch in the pitch direction calculated by the average value buffer 7621b are held in, for example, buffer memories included in the average value buffers 7621a and 7621b every predetermined period. For example, 8 pieces of data regarding average values in every 8 periods are held here.

In step S6, the follow shot detection units 761a and 761b determines whether or not the follow shot flag is set, and determines whether or not the period is the follow shot detection period B shown in FIG. 2.

If it is determined that the period is the follow shot detection period B, the procedure moves to step S7, and then whether or not the state of the present apparatus (camera) is the exposure state is determined. If the period is not the follow shot detection period B, the procedure moves to step S11, and the panning angular velocity ωpan in the pitch direction and the tilting angular velocity ωtil in the yaw direction are each cleared to "0".

In contrast, if the state of the present apparatus (camera) is the exposure state, the system controller 6 determines in step S8 whether the present apparatus (camera) is performing the first correction processing after the start of correction or is performing a correction.

If it is determined that the present apparatus (camera) is performing the first correction processing after the start of correction, the system controller 6 causes each of the integration units 7622a and 7622b to perform an integral operation in step S9. The integration unit 7622a integrates 8 pieces of data regarding the average values held by the average value buffer 7621a. Similarly, the integration unit 7622b integrates 8 pieces of data regarding the average values held by the average value buffer 7621b.

In step S10, the follow shot angular velocity calculation unit 7623 obtains the ratio between the integration value of the angular velocity ωyaw in the yaw direction calculated by the integration unit 7622a and the integration value of the angular velocity ωpitch in the pitch direction calculated by the integration unit 7622b, and the magnitude correlation of absolute values between the integration value of the angular velocity ωyaw and the integration value of the angular velocity ωpit. The follow shot angular velocity calculation unit 7623 then calculates the panning angular velocity ωpan in the yaw direction and the follow shot angular velocity ωpitch in the pitch direction which are angular velocities associated with the follow shots in the yaw direction and the pitch direction.

In step S12, the subtraction unit 763a receives the angular velocity ωyaw in the yaw direction having the sign (+, −) output from the subtraction unit 75a, subtracts the panning angular velocity ωpan in the yaw direction calculated by the follow shot angular velocity calculation unit 762 from the angular velocity ωyaw in the yaw direction, and calculates a yaw correction angular velocity to be corrected.

In step S12, the subtraction unit 763b receives the angular velocity ωpitch in the pitch direction having the sign (+, −) output from the subtraction unit 75b, subtracts the tilting angular velocity ωtil in the pitch direction calculated by the follow shot angular velocity calculation unit 762 from the angular velocity ωpitch in the pitch direction, and calculates a pitch correction angular velocity to be corrected.

The blur correction unit 77 integrates the yaw correction angular velocity and pitch correction angular velocity to calculate correction amounts, and performs corrected driving of the drive unit 5 in accordance with the correction amounts so that the blur amounts associated with the camera shake other than the angular velocity associated with the follow shot are only corrected.

When the follow shot is not detected, both the panning angular velocity ωpan and the tilting angular velocity ωtil are 0, so that the system controller 6 functions for normal camera shake correction.

Next, the specific operation of the follow shot detection processing (step S3) is described with reference to a block configuration diagram of the follow shot detection unit shown in FIG. 8 and a follow shot detection processing control flowchart shown in FIG. 11.

In step S31, each of the follow shot detection units 761*a* and 761*b* determines whether or not the follow shot flag is set, and thereby determines whether the follow shot is being performed. The follow shot flag is set by the follow shot detection flag unit 7615. If it is determined that the follow shot is already started and the follow shot flag is set, the follow shot detection units 761*a* and 761*b* bypass the present follow shot detection processing.

In contrast, if the follow shot flag is not set, the threshold comparison unit 7612 compares the average value of the angular velocities ωyaw in the yaw direction calculated by the moving average calculation unit 7611 with the threshold TH in the yaw direction as shown in FIG. 2, and determines whether the average value Aveωyaw of the angular velocities ωyaw in the yaw direction has exceeded the threshold TH in the yaw direction, in step S32.

If it is determined that the angular velocity ωyaw in the yaw direction or the angular velocity ωpitch in the pitch direction has exceeded the threshold TH in the yaw direction, the clocking unit 7613 counts up a counter for measuring the determined periods t1 to t2 when it is determined in step S33 that the average value Aveωyaw of the angular velocities ωyaw in the yaw direction and the average value Aveωpitch of the angular velocities ωpitch in the pitch direction have respectively exceeded the thresholds TH in the yaw direction and the pitch direction. The clocking unit 7613 counts up the counter and then measures the detection period A shown in FIG. 2.

If the angular velocity ωyaw in the yaw direction or the angular velocity ωpitch in the pitch direction has not exceeded the threshold TH, the clocking unit 7613 clears the measurement value in the counter in each of the corresponding directions to "0" in step S34.

In step S35, the clocking unit 7613 determines whether the measurement period t1 to t2 in which the counter is counted up has exceeded the predetermined detection period A.

If it is determined that the measurement period t1 to t2 has exceeded the predetermined detection period A, the follow shot detection flag unit 7615 sets the follow shot flag at the time t2 when the measurement period has exceeded the predetermined detection period A, in step S36.

In step S37, the limit detection unit 7616 clears the follow shot detection flag at the point where the period clocked by the clocking operation in the clocking unit 7613 has exceeded the preset detection period. If the zero crossing is detected by the zero crossing detection unit 7614, the limit detection unit 7616 clears the follow shot flag at the zero crossing detection time t7. As a result, the period from the time t2 at which the follow shot flag is set to the time t7 at which the follow shot flag is cleared is the follow shot detection period B. The follow shot operation is being performed in the follow shot detection period B.

The specific operation of the follow shot angular velocity calculation processing (step S10) is described with reference to a block configuration diagram of the follow shot angular velocity calculation unit 762 shown in FIG. 9 and a flowchart of the control regarding the follow shot angular velocity calculation shown in FIG. 12.

If the follow shot is detected, that is, if exposure is started in the follow shot detection period B, the follow shot angular velocity calculation unit 7623 receives an integration value $\int Ave\_\omega yaw$ by the integration unit 7622*a* and an integration value $\int Ave\_\omega pitch$ by the integration unit 7622*b* that are calculated at the first period to start a blur correction.

In step S91, the follow shot angular velocity calculation unit 7623 obtains each of absolute values $|\int Ave\_\omega yaw|$ and $|\int Ave\_\omega pitch|$ of the integration value $\int Ave\_\omega yaw$ in the yaw direction and the integration value $\int Ave\_\omega pitch$ in the pitch direction, and determines which of the absolute values is higher as shown in the following expression (5).

$$|\int Ave\_\omega yaw| > |\int Ave\_\omega pitch| \quad (5)$$

If it is determined that the absolute value $|\int Ave\_\omega yaw|$ of the integration value in the yaw direction is higher, the follow shot angular velocity calculation unit 7623 determines that the camera body 1 is preferentially shaken in the yaw direction to perform the follow shot, and determines the average value Aveωyaw of the angular velocities ωyaw in the yaw direction as the panning angular velocity ωpan in the yaw direction in step S92.

In step S93, the follow shot angular velocity calculation unit 7623 calculates the tilting angular velocity ωtil in the pitch direction on the basis of the average value Aveωyaw of the angular velocities ωyaw in the yaw direction and the angular velocity ωpitch in the pitch direction shown in the above expression (3). That is, the follow shot angular velocity calculation unit 7623 calculates the following expression (6) to figure out the tilting angular velocity ωtil in the pitch direction.

$$\omega til = Ave\omega yaw \times (\int Ave\_\omega pitch / \int Ave\_\omega yaw) \quad (6)$$

In contrast, if it is determined that the absolute value $|\int Ave\_\omega pitch|$ of the integration value in the pitch direction is higher, the follow shot angular velocity calculation unit 7623 determines that the camera body 1 is preferentially shaken in the pitch direction to perform the follow shot, and determines the average value Aveωpitch of the angular velocities ωpitch in the pitch direction as the tilting angular velocity ωtil in the pitch direction in step S94.

In step S95, the follow shot angular velocity calculation unit 7623 calculates the panning angular velocity ωpan in the yaw direction on the basis of the average value Aveωpitch of the angular velocities ωpitch in the pitch direction and the angular velocity ωyaw in the yaw direction shown in the above expression (4). That is, the follow shot angular velocity calculation unit 7623 calculates the following expression (7) to figure out the reference angular velocity ωpan in the yaw direction.

$$\omega pan = Ave\omega pitch \times (\int Ave\_\omega yaw / \int Ave\_\omega pitch) \quad (7)$$

As described above, the subtraction unit 763*a* then subtracts the angular velocity ωyaw in the yaw direction output from the subtraction unit 75*a* and the panning angular velocity ωpan in the yaw direction calculated in the above manner, and calculates an angular velocity to be corrected, that is, a yaw correction angular velocity.

In addition, the subtraction unit 763*b* then subtracts the angular velocity ωpitch in the pitch direction output from the subtraction unit 75*b* and the tilting angular velocity ωtil in the pitch direction calculated in the above manner, and calculates an angular velocity to be corrected, that is, a pitch correction angular velocity.

The blur correction unit 77 integrates the yaw correction angular velocity and the pitch correction angular velocity output from the follow shot control unit 76, and calculates blur amounts generated in the imaging plane of the image pickup device 4 from the angular changes and the focal distance of the optical system 2. The blur correction unit 77 obtains each of the blur correction amounts G (Gy, Gp) in the yaw direction and the pitch direction to offset the blur amounts, and issues a drive instruction corresponding to the blur correction amounts G (Gy, Gp) to the drive unit 5 the drivers 73a and 73b, respectively.

As a result, the drive unit 5 drives the image pickup device 4 to move in the X-axis direction and the Y-axis direction on the basis of the drive instruction corresponding to each of the blur correction amounts G (Gy, Gp) in the yaw direction and the pitch direction, so that the blur generated in the imaging plane of the image pickup device 4 is corrected.

Thus, according to the first embodiment described above, in the follow shot detection period B, in the yaw direction, the panning angular velocity ωpan of the angular velocity ωyaw in the yaw direction is calculated on the basis of the output signal from the angular velocity sensor 8a, the panning angular velocity ωpan in the yaw direction and the angular velocity ωyaw in the yaw direction are subtracted, and the blur correction amount G (Gy) in the yaw direction is calculated. On the other hand, in the pitch direction as well, the tilting angular velocity ωtil of the angular velocity ωpitch in the pitch direction is calculated on the basis of the output signal from the angular velocity sensor 8b, the tilting angular velocity ωtil in the pitch direction and the angular velocity ωpitch in the pitch direction are subtracted, and the blur correction amount G (Gp) in the pitch direction is calculated. The drive instructions corresponding to the blur correction amounts G (Gy, Gp) in the yaw direction and the pitch direction are issued to drive the image pickup device 4 to move in the X-axis direction and the Y-axis direction.

In particular, in the calculation of the panning angular velocity ωpan in the yaw direction and the tilting angular velocity ωtil pan in the pitch direction, the integration value ∫Ave_ωyaw of the average value of the angular velocities ωyaw in the yaw direction and the integration value ∫Ave_ωpitch of the average value of the angular velocities ωpitch in the pitch direction are obtained, and which of the absolute values |∫Ave_ωyaw| and |∫Ave_ωpitch| of the integration value ∫Ave_ωyaw in the yaw direction and the integration value ∫Ave_ωpitch in the pitch direction is higher is determined.

If it is determined that the absolute value |∫Ave_ωyaw| of the integration value in the yaw direction is higher, the panning angular velocity ωpan in the yaw direction is determined as the average value Aveωyaw of the angular velocities ωyaw in the yaw direction, and the above expression (6) is calculated to figure out the tilting angular velocity ωtil in the pitch direction.

In contrast, if the absolute value |∫Ave_ωpitch| of the integration value in the pitch direction is higher, the tilting angular velocity ωtil in the pitch direction is determined as the average value of the angular velocities ωpitch in the pitch direction, and the above expression (7) is calculated to figure out the reference angular velocity in the yaw direction.

Thus, if the follow shot is detected, the panning angular velocity ωpan and the tilting angular velocity ωtil in the yaw direction and the pitch direction are calculated on the basis of the angular velocities ω immediately before photography, and during the exposure period P, the movement amount of the subject generated in the imaging plane of the image pickup device 4 is corrected so that the movement amount may be a movement amount based on the panning angular velocity ωpan and the tilting angular velocity ωtil in the yaw direction and the pitch direction.

As a result, according to the first embodiment described above, the variation of the moving velocity of the camera body 1 has no influence, and a blur in a direction that intersects at right angles with the shaking direction of the camera body 1 can be corrected even if the detection direction of the angular velocity ω and the moving direction of the camera body 1 are inclined, so that the probability of a successful follow shot can be improved.

According to the first embodiment described above, even when the moving velocity of the camera is not constant during follow shot photography in an imaging apparatus such as a camera, a constant movement amount of the subject image generated on the imaging plane of the image pickup device 4 can be maintained. Moreover, even when the moving direction of the camera is inclined relative to either the pitch direction or the yaw direction, that is, even when the camera is moved in a two-dimensional direction, a blur in a direction that intersects at right angles with the shaking direction can be lessened, the success rate of a follow shot is improved, and the degree of technical difficulty of the follow shot can be reduced.

Second Embodiment

Next, the outline of a second embodiment of the present invention is described.

FIG. 13A to FIG. 13E show how the camera body 1 is moved to follow a subject 100 which moves in parallel. FIG. 13A and FIG. 13B show sequential frame images of a live-view displayed on the EVF 11 when the camera body 1 is moved to follow the subject.

The live-view is displayed on the EVF 11 after the following: the focal plane shutter 3 is opened while the camera is waiting for photography, and an image obtained by the photoelectric conversion of the subject image formed on the image pickup device 4 is read by the system controller 6 in real time and subjected to image processing.

FIG. 13C shows the movement of the subject 100 between frames. Vectors Δx and Δy are detected from the movement amount between frames. The vector ΔX indicates a movement amount in the X-axis direction on the imaging plane of the image pickup device 4. The vector Δy indicates a movement amount in the Y-axis direction on the imaging plane of the image pickup device 4. The angle ωyaw in the yaw direction and the angle ωpitch in the pitch direction are angular changes between frames detected by the angular velocity sensor 8 (the yaw angular velocity sensor 8a and the pitch angular velocity sensor 8b). How the camera body 1 is moved in the direction of the angle ωpan is shown by the angle ωyaw in the yaw direction and the angle ωpitch in the pitch direction.

FIG. 13D shows the camera body 1 seen from the rear surface when the subject 100, for example, a vehicle which moves in parallel shown in FIG. 13A and FIG. 13B is imaged. In this state, the panning operation is performed while the camera body 1 is inclined in the detection direction of the angular velocity ω.

FIG. 13E shows a schematic diagram in which the movement direction of the subject 100 is converted into a horizontal direction when the panning operation is performed while the camera body 1 is inclined in the detection direction of the angular velocity ω as shown in FIG. 13A. A vector θtarget shown in FIG. 13E is a value obtained by converting the movement direction of the subject 100 and the velocity of the subject 100 into an angular change of the camera body 1.

A movement amount of the blur of the image of the subject 100 appears in the image photographed by the image pickup device 4 when the moving velocity of the camera body 1 does not correspond to the velocity of the subject 100 as shown in FIG. 13C.

A focal distance f during photography can be converted into an angular change by the following expressions (8) and (9) on the basis of a movement amount AD of the blur of the image of the subject 100.

$$\Delta D = f \times \tan \Delta \theta \quad (8)$$

$$\Delta \theta = a\tan(\Delta D/f) \quad (9)$$

wherein ΔD is the movement amount, and f is the focal distance.

If the time between frames is T, T is a time period determined by a frame rate, an angular velocity ωc can be obtained by the following expression (10).

$$\omega c = \Delta \theta / T \quad (10)$$

Angular velocities ωx and ωy that have been converted into the yaw direction and the pitch direction can be obtained by the calculation of the angular velocity ωc.

Each of the difference between the calculated angular velocity ωx and the detected angular velocity ωyaw and the difference between the calculated angular velocity ωy and the detected angular velocity ωpitch is obtained to correct the panning angular velocity ωpan and the tilting angular velocity ωtil so that the moving velocity of the camera body 1 can be adjusted to the moving velocity of the subject 100.

In the present embodiment, deviations from the panning angular velocity ωpan and the tilting angular velocity ωtil are corrected, so that the deviation of the subject image on the imaging plane of the image pickup device 4 can be eliminated.

The configuration of the present apparatus is described below with reference to the drawings. The configuration of the present apparatus is substantially the same as the configuration according to the first embodiment described above. Therefore, FIG. 5 to FIG. 9 are used, and the same parts as those in the first embodiment described above are provided with the same reference signs and are thus not described in detail. The differences are described.

The system controller 6 detects the subject 100 in the vicinity of the center of the photographic field angle, and calculates an inter-frame movement amount of the subject 100, during the display of the live-view. There have already been various methods of calculating the movement amount, and any one of the calculation methods may be used.

The system controller 6 calculates movement amounts of the subject 100 in the X-axis direction and the Y-axis direction relative to the imaging plane of the image pickup device 4, and reports each of the movement amounts in the X-axis direction and the Y-axis direction to the blur correction microcomputer 7 by serial communication frame by frame.

The blur correction microcomputer 7 receives each of the movement amounts in the X-axis direction and the Y-axis direction by the communication unit 78 via the SIO 72.

FIG. 14 shows a specific block configuration diagram of the follow shot control unit 76. Two angle conversion units 764a and 764b and two subtraction units 763c and 763d are added to the follow shot control unit 76 as compared to the follow shot control unit 76 according to the first embodiment described above.

The angle conversion unit 764a calculates the above expressions (9) and (10) on the basis of the movement amount in the X-axis direction to figure out the angular velocity ωx converted into the yaw direction.

Similarly, the angle conversion unit 764b calculates the above expressions (9) and (10) on the basis of the movement amount in the Y-axis direction to figure out the angular velocity ωy converted into the pitch direction.

The subtraction unit 763c subtracts the angular velocity ωx converted into the yaw direction from the panning angular velocity ωpan in the yaw direction calculated by the offset detection unit 762.

The subtraction unit 763d subtracts the angular velocity ωy converted into the pitch direction from the tilting angular velocity ωtil in the pitch direction calculated by the offset detection unit 762.

Next, the operation of the apparatus having the above configuration is described. The differences between FIG. 12 and FIG. 15 are described.

FIG. 15 shows a reference angular velocity calculation start flowchart.

In step S90, the angle conversion unit 764a calculates the above expressions (6) and (7) on the basis of the movement amount in the X-axis direction to figure out the angular velocity ωx converted into the yaw direction.

The angle conversion unit 764a calculates the angular velocity ωx so that the inter-frame movement amounts reported from the system controller 6 are ΔX and ΔY. In the present embodiment, the live-view frame rate is 60 frames per second (fps), so that the calculated angular change is multiplied by 60 which forms the above rate of 60 fps, leading to the angular velocity ωx.

$$\omega x = a\tan(\Delta X/f) \times 60 \quad (11)$$

Similarly, in the same step S90, the angle conversion unit 764b calculates the above expressions (6) and (7) on the basis of the movement amount in the Y-axis direction to figure out the angular velocity ωy converted into the pitch direction. In the calculation of the angular velocity ωy as well, the live-view frame rate is 60 fps, so that the calculated angular change is multiplied by 60 which forms the above rate of 60 fps, leading to the angular velocity ωy.

$$\omega y = a\tan(\Delta Y/f) \times 60 \quad (12)$$

In step S93, the follow shot angular velocity calculation unit 7623 then calculates the tilting angular velocity ωtil in the pitch direction on the basis of the average value of the angular velocities ωyaw in the yaw direction, the angular velocity ωpitch in the pitch direction shown in the above expression (3), and the angular velocity ωy. That is, the follow shot angular velocity calculation unit 7623 calculates the following expression (13) to figure out the reference angular velocity ωtil in the pitch direction.

$$\omega til = Ave\omega yaw \times (\int Ave\_\omega pitch / \int Ave\_\omega yaw) - \omega y \quad (13)$$

In contrast, if the absolute value |∫Ave_ωpitch| of the integration value in the pitch direction is higher, the follow shot angular velocity calculation unit 7623 calculates the panning angular velocity ωpan in the yaw direction on the basis of the average value Aveωpitch of the angular velocities ωpitch in the pitch direction, the angular velocity ωyaw in the yaw direction shown in the above expression (4), and the angular velocity ωx. That is, the follow shot angular velocity calculation unit 7623 calculates the following expression (14) to figure out the panning angular velocity ωpan in the yaw direction.

$$\omega = Ave\omega pitch \times (\int Ave\_\omega yaw / \int Ave\_\omega pitch) - \omega x \quad (14)$$

Thus, according to the second embodiment described above, before the start of photography, the angular velocity ωx converted into the yaw direction is calculated on the basis of the movement amount in the X-axis direction, and the angular velocity ωy converted into the pitch direction is calculated on the basis of the movement amount in the Y-axis direction. During exposure, the panning angular velocity and the tilting angular velocity are corrected by the converted angular velocities ωx and ωy. Therefore, in addition to the advantageous effects according to the first embodiment described above, the subject image can be held from moving on the imaging plane of the image pickup device 4 even if the velocity of moving the camera body 1 is not the same as the movement of the subject. Consequently, the panning angular velocity and the tilting angular velocity can be the same as the subject velocity.

Third Embodiment

Next, a third embodiment of the present invention is described.

The configuration of the present apparatus is substantially the same as the configuration according to the first embodiment described above. Therefore, FIG. 5 to FIG. 9 are used, and the same parts as those in the first embodiment described above are provided with the same reference signs and are thus not described in detail. The differences are described.

Figure 16:
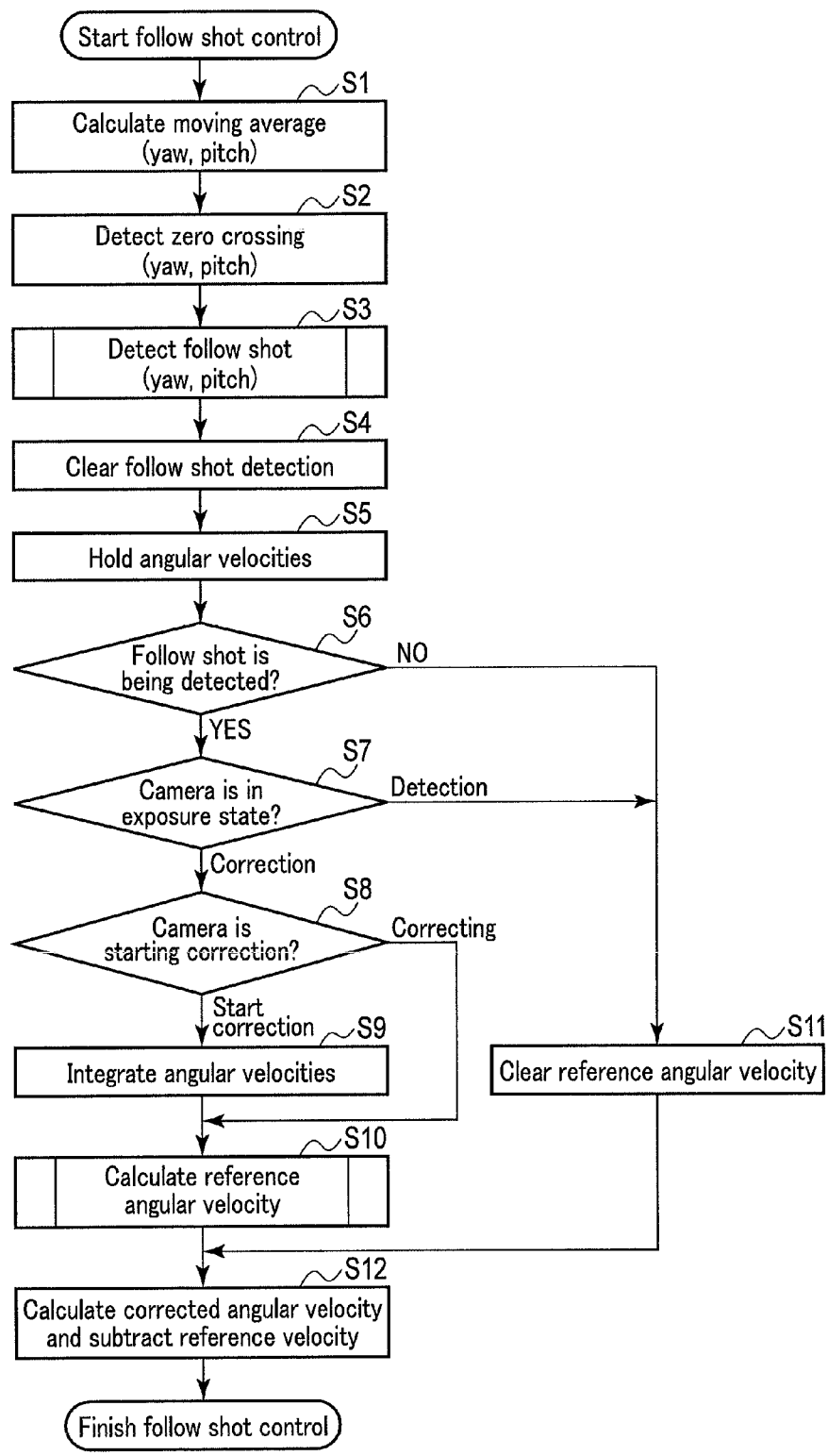
FIG. 16 is a follow shot control start flowchart of the apparatus.

FIG. 16 shows a follow shot control start flowchart. The difference between this follow shot control start flowchart and the above-described follow shot control start flowchart shown in FIG. 10 is the step position to perform the follow shot angular velocity calculation (step S10).

That is, in the first embodiment described above, the follow shot angular velocity calculation unit 7623 calculates the panning angular velocity ωpan and the tilting angular velocity ωtil in the yaw direction and the pitch direction after each of the integration units 7622a and 7622b integrates 8 pieces of data regarding the latest average values in step S9. In contrast, in the present embodiment, the panning angular velocity ωpan and the tilting angular velocity ωtil in the yaw direction and the pitch direction are calculated after it is determined in step S8 that the present apparatus (camera) is making correction.

Thus, according to the third embodiment described above, the panning angular velocity ωpan and the tilting angular velocity ωtil in the yaw direction and the pitch direction are calculated while the present apparatus (camera) is making correction, so that the panning angular velocity ωpan and the tilting angular velocity ωtil in the yaw direction and the pitch direction can be repeatedly calculated. Thus, the panning angular velocity ωpan and the tilting angular velocity ωtil during exposure are updated each time while the ratio between the yaw direction angular velocity and the pitch direction angular velocity at the start of photography is maintained. Therefore, even when the velocity of moving the camera body 1 significantly changes, the movement component that intersects at right angles with the moving direction of the camera body 1 can be solely corrected. As a result, even when the rise of the corner of a subject such as a race car has a high acceleration, the movement component that intersects at right angles with the moving direction of the camera body 1 can be corrected.

The present invention is not limited to each of the embodiments described above, and may be modified in the following manner. For example, the image pickup device 4 is moved in the X-axis direction and the Y-axis direction by the drive unit 5 to correct the movement component. However, the present invention is not limited to this, and the optical system 2 may be moved in the X-axis direction and the Y-axis direction to correct the movement component.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An imaging apparatus comprising:
   an optical system which images a subject;
   an image pickup device which outputs an image signal of a subject image formed by the optical system;
   a first angular velocity detection unit which detects a first angular velocity for rotation in a first rotation direction around a direction perpendicular to an imaging plane of the image pickup device as a first axis;
   a second angular velocity detection unit which detects a second angular velocity for rotation in a second rotation direction around a direction that intersects at right angles with the first axis on the imaging plane of the image pickup device as a second axis;
   a follow shot control unit,
   the follow shot control unit including
   a follow shot detection unit which detects whether a state is a follow shot state on the basis of the first angular velocity detected by the first angular velocity detection unit and the second angular velocity detected by the second angular velocity detection unit, and
   an angular velocity calculation unit which calculates a panning angular velocity and a tilting angular velocity generated by the follow shot to correct the first angular velocity and the second angular velocity when the follow shot detection unit detects that the state is the follow shot state;
   a blur correction unit which calculates an image blur correction amount in accordance with the first angular velocity and the second angular velocity corrected by the follow shot control unit; and
   a blur drive unit which drives one or both of the optical system and the image pickup device in a direction to counteract an image blur on the basis of the image blur correction amount calculated by the blur correction unit and thus corrects the image blur generated in the imaging plane of the image pickup device,
   wherein in the follow shot control unit, when the follow shot detection unit detects that the state is the follow shot state associated with a panning or tilting operation, the angular velocity calculation unit determines a rotation direction to be the main direction of the follow shot and an inclination angle on the basis of magnitude correlation between the absolute values of the first angular velocity and the second angular velocity, and respectively calculates, on the basis of the determination, the panning angular velocity and the tilting angular velocity to be reference angular velocities in the first or second direction based on one of the first and second angular velocities on the basis of the inclination angle immediately before exposure and the ratio between the first angular velocity and the second angular velocity, and
   the blur correction unit calculates the image blur correction amount on the basis of the difference between the first angular velocity and the panning angular velocity and the difference between the second angular velocity and the tilting angular velocity.

2. The imaging apparatus according to claim 1, wherein the angular velocity calculation unit of the follow shot control unit compares an absolute value of the first angular velocity with an absolute value of the second angular velocity, and
the angular velocity calculation unit sets the first angular velocity as a reference angular velocity in the first direction when the absolute value of the first angular velocity is higher than the absolute value of the second angular velocity, and sets the inclination angle to be the main direction of the follow shot on the basis of the reference angular velocity and a value in which an average integration value of the second angular velocity is divided by an average integration value of the first angular velocity, and
the angular velocity calculation unit sets the second angular velocity as a reference angular velocity in the second direction when the absolute value of the second angular velocity is higher than the absolute value of the first angular velocity, and sets the inclination angle to be the main direction of the follow shot on the basis of the reference angular velocity and a value in which an average integration value of the first angular velocity is divided by an average integration value of the second angular velocity.

3. The imaging apparatus according to claim 1, further comprising a control unit which detects a movement amount of the subject relative to a preset coordinate axis from the image signal output from the image pickup device,
wherein the follow shot control unit further includes an angular velocity conversion unit which converts the movement amount of the subject detected by the control unit into a converted angular velocity corresponding to each movement angular velocity in the first and second directions, and
the blur correction unit corrects the panning angular velocity and the tilting angular velocity to be the respective reference angular velocities in the first and second directions on the basis of the respective converted angular velocities converted by the angular velocity conversion unit.

4. The imaging apparatus according to claim 1, wherein the angular velocity calculation unit of the follow shot control unit calculates the inclination angle on the basis of an integration value or an average value of times of the first angular velocity in the first direction and the second angular velocity in the second direction in a first period before exposure.

5. The imaging apparatus according to claim 4, wherein the angular velocity calculation unit of the follow shot control unit calculates the first angular velocity to be the panning angular velocity or the tilting angular velocity, or the second angular velocity which is an average value in a second period included in the first period before the exposure, and
the first period is a time condition longer than the second period.

6. The imaging apparatus according to claim 1, further comprising an operation unit to perform an operation to start exposure,
wherein the angular velocity calculation unit of the follow shot control unit calculates the panning angular velocity and the tilting angular velocity immediately before the exposure and does not update the reference angular velocities in the first and second directions during the exposure, when the follow shot detection unit detects the follow shot state while receiving the operation of the operation unit.

7. The imaging apparatus according to claim 1, wherein the angular velocity calculation unit of the follow shot control unit determines the rotation direction to be the main direction of the follow shot on the basis of the ratio between the first angular velocity and the second angular velocity calculated before exposure and on the basis of which of the absolute values is higher,
the angular velocity calculation unit sets the first angular velocity as the panning angular velocity, and determines the tilting angular velocity on the basis of the panning angular velocity and the ratio calculated before the exposure, when the operation is determined to be the panning from the determined rotation direction to be the main direction during the exposure, and
the angular velocity calculation unit sets the second angular velocity as the tilting angular velocity, and determines the panning angular velocity on the basis of the tilting angular velocity and the ratio calculated before the exposure, when the operation is determined to be the tilting from the determined rotation direction to be the main direction during the exposure.

8. An image blur correction method of an imaging apparatus, the imaging apparatus comprising an optical system which images a subject, and an image pickup device which outputs an image signal of a subject image formed by the optical system, the image blur correction method comprising:
detecting a first angular velocity for rotation in a first rotation direction around a direction perpendicular to an imaging plane of the image pickup device as a first axis;
detecting a second angular velocity for rotation in a second rotation direction around a direction that intersects at right angles with the first axis on the imaging plane of the image pickup device as a second axis;
detecting whether the state is a follow shot state on the basis of the first angular velocity to be detected and the second angular velocity to be detected;
calculating a panning angular velocity and a tilting angular velocity generated by the follow shot to correct and calculate the first angular velocity and the second angular velocity when the state is detected to be the follow shot state;
calculating an image blur correction amount in accordance with the first angular velocity and the second angular velocity that have been corrected and calculated; and
driving one or both of the optical system and the image pickup device in a direction to counteract an image blur on the basis of the calculated image blur correction amount and thus correcting the image blur generated in the imaging plane of the image pickup device,
wherein in the follow shot control, when a state is detected to be the follow shot state associated with a panning or tilting operation, a rotation direction to be the main direction of the follow shot and an inclination angle are determined on the basis of magnitude correlation between the absolute values of the first angular velocity and the second angular velocity, and
on the basis of the determination, the panning angular velocity and the tilting angular velocity to be reference angular velocities in the first or second direction based on one of the first and second angular velocities are respectively calculated on the basis of the inclination angle immediately before exposure and the ratio between the first angular velocity and the second angular velocity, and in the correction of the image blur, the image blur correction amount is calculated on the basis of the difference between the first angular velocity and the panning angular velocity and the difference between the second angular velocity and the tilting angular velocity.

\* \* \* \* \*